United States Patent [19]

Resch

[11] Patent Number: 5,054,861

[45] Date of Patent: Oct. 8, 1991

[54] BRAKING SYSTEM FOR A VEHICLE WITH DRIVE-SLIP CONTROL (ASR) AND ANTI-LOCK SYSTEM (ABS)

[75] Inventor: Reinhard Resch, Stuttgart, Fed. Rep. of Germany

[73] Assignee: Daimler-Benz Aktiengesellschaft, Stuttgard, Fed. Rep. of Germany

[21] Appl. No.: 456,855

[22] Filed: Dec. 26, 1989

[30] Foreign Application Priority Data

Jan. 13, 1989 [DE] Fed. Rep. of Germany ....... 3900852

[51] Int. Cl.$^5$ ................................................ B60T 8/34
[52] U.S. Cl. ...................................... 303/110; 303/93; 303/113; 303/116
[58] Field of Search ...................... 180/197; 303/92, 96, 303/97, 100, 103, 105, 107, 110, 116, 119; 364/426.02, 426.03

[56] References Cited

U.S. PATENT DOCUMENTS

| 4,861,118 | 8/1989 | Burckhardt et al. | 303/110 |
| 4,904,029 | 2/1990 | Leiber | 303/92 X |

FOREIGN PATENT DOCUMENTS

| 3802133 | 8/1989 | Fed. Rep. of Germany . |
| 2214253 | 8/1989 | United Kingdom . |
| 2214254 | 8/1989 | United Kingdom . |
| 2224323 | 5/1990 | United Kingdom . |

*Primary Examiner*—Matthew C. Graham

*Attorney, Agent, or Firm*—Evenson, Wands, Edwards, Lenahan & McKeown

[57] ABSTRACT

In a drive-slip control device on a road vehicle equipped with an anti-lock system and having a hydraulic dual-circuit brake system, in which at least on the brake circuit of the driven vehicle wheels, the ABS works on the return-flow principle and the ASR on the principle of decelerating a vehicle wheel tending to spin by subjecting its wheel brake to pressure. For the drive-slip control mode, a return pump of the ABS (assigned to the brake circuit of the driven vehicle wheels) is utilized as an auxiliary-pressure source. By means of an ASR control valve, the affected brake unit can be shut off from the main brake line of the brake circuit of the driven vehicle wheels. The return pump is connected to the return line of the brake circuit of the driven vehicle wheels. By means of an accumulator isolating valve the return line can be shut off from a buffer accumulator provided for receiving brake fluid bled from the wheel brake and from the inlet of the return pump during normal braking. In a braking operation subjected to the anti-lock control the return line can be connected to the buffer accumulator. An isolating valve is connected to that portion of the low-pressure supply path of the return pump extending from the outlet non-return valve during braking and wherein the low-pressure supply path of the return pump is shut off from the wheel brake during a pressure build-up phase of the drive-slip control.

31 Claims, 20 Drawing Sheets

BRAKING SYSTEM FOR A VEHICLE WITH DRIVE-SLIP CONTROL (ASR) AND ANTI-LOCK SYSTEM (ABS)

BACKGROUND AND SUMMARY OF THE INVENTION

The invention relates to a brakings system for a road vehicle having a drive-slip control device (ASR) and an anti-lock system (ABS) and with a hydraulic dual-circuit brake system, in which one brake circuit is assigned to the driven vehicle wheels and the other brake circuit to the non-driven vehicle wheels. The two brake circuits are designed as static brake circuits, with each circuit being assigned to an outlet-pressure space of a brake unit provided for brake actuation. The braking system operates with the following features:

a) At least on the brake circuit of the driven vehicle wheels, the ABS works on the return-flow principle, whereby in pressure reduction phases of the anti-lock control that quantity of brake fluid (corresponding to that quantity of brake fluid flowing off from the wheel brake(s) into a return line connected to a buffer accumulator) is pumped back into the brake unit by a return pump which is connected on its inlet side to the buffer accumulator and on the outlet side to the brake unit;

b) The ASR works on the principle of decelerating a vehicle wheel tending to spin, by subjecting its wheel brake to pressure from an auxiliary-pressure source in such a way that its drive slip remains within a value range compatible with sufficient dynamic stability of the vehicle;

c) For the drive-slip control mode, the return pump of the ABS (which is assigned to the brake circuit of the driven vehicle wheels and which has its inlet side connected to a return line of the brake circuit of the driven vehicle wheels for directing brake fluid from the reservoir to the return pump during ASR) is also utilized as an auxiliary-pressure source from which, during pressure build-up phases, pressure is supplied to the wheel brake of the vehicle wheel to be decelerated during ASR;

d) An ASR control valve is changed over from a basic position O (which is assigned to the normal braking mode and ABS mode and in which brake fluid can be positively displaced into the wheel-brake cylinders of the brakes of the driven vehicle wheels as a result of the actuation of the brake unit) into an alternative functional position I, in which flow-off of brake fluid from the main brake line of the brake circuit of the driven vehicle wheels to its outlet-pressure space in the brake unit is prevented;

e) An accumulator isolating valve is located in a return line of the brake circuit (II) of the driven vehicle wheels and is shut off from a buffer accumulator and from an inlet of the return pump during normal braking, and is connected to the buffer accumulator during ASR;

An ASR of this general type is the subject of the applicant's own older and not previously published German Offenlegeungsschrift 3,802,133 which describes, in combination with an ABS working on the known return-flow principle, an ASR working on the principle of decelerating a driven vehicle wheel tending to spin by subjecting its wheel brake to pressure and wherein a return pump of the ABS assigned to the brake circuit of the driven vehicle wheels is utilized as an auxiliary-pressure source for the ASR. This return pump, conventionally designed as a free-piston pump, is fed via an outlet non-return valve of precharging pump during ASR to direct brake fluid from out of the brake-fluid reservoir of the brake system into the return line of the ABS. For generating brake pressure, a return pump conveys brake fluid into the main brake line which is shut off from the brake unit by means of an ASR control valve during ASR. Furthermore, there is an ASR outlet valve which is connected between the return line of the brake circuit of the driven vehicle wheels and the brake-fluid reservoirs. The basic position of the ASR outlet valve is its shut-off position and only in pressure reduction phases of ASR is it moved into its through-flow position so that brake fluid can flow off from the return line towards the brake-fluid reservoir.

In normal braking, that is to say braking not undergoing a brake-pressure control, this return line is pressureless. Consequently, a leak in the admission-pressure supply path of the return pump utilized for the drive-slip control, (for example a leak of the outlet non-return valve of the precharging pump or of the ASR outlet valve), cannot be detected.

However, if such a leak is present and the front-axle brake circuit fails during a braking operation, then as a result of this (if during this braking operation the ABS responds on the rear-axle driven vehicle wheel brake circuit) this brake circuit can empty via the leak, with the consequence that the two brake circuits fail. This complete failure of the brake system is permanent. The potential danger that with a failure of the front-axle brake circuit, the rear-axle brake circuit too will fail, (if the latter has a leak in the return-pump supply circuit) is of course unacceptable. This is especially true since the probability of failure of the rear-axle brake circuit is relatively high because it opens the ASR outlet valve towards the brake-fluid reservoir and because the precharging pump is connected to the return line.

The object of the invention is to improve an ASR of the type aforementioned to the effect that a leak in the admission-pressure supply circuit of the return pump is clearly detectable by pedal reaction during the actuation of the brake system, even during normal braking, and the danger of a complete failure of the brake system can thereby be countered in good time.

According to the invention, this object is achieved by having an accumulator isolating valve in a return line of the brake circuit of the driven vehicle wheels shut off from the buffer accumulator and from the inlet of the return pump during normal braking and which can be connected to the buffer accumulator during ABS. An outlet non-return valve is connected between the return line and the brake-fluid reservoirs and is held in its shut-off position by means of a higher pressure in the return line. At least one isolating valve is opened to connect a portion of the low-pressure supply path of the return pump extending from the outlet non-return valve to one of the wheel brakes in the functional position assigned to normal braking. The low-pressure supply path of the return pump is shut off from the wheel brake(s) in the functional position assigned to a pressure build-up phase of the drive-slip control. An accumulator isolating valve is provided in the return line of the brake circuit of the driven vehicle wheels so that the return line can be shut off from its return pump and from a buffer accumulator which is connected to the inlet side of the return pump. In the brake-pressure reduction mode of ABS, the accumulator isolating valve opens to allow brake fluid to flow from the wheel brakes (subjected to ABS) to the return pump. Before this flow is pumped back into the main brake line of this brake circuit by the return pump, an activation of valve(s) provided for normal brake-pressure control for the brakes affected by ABS occurs. These valves are changed from their functional position assigned to the normal braking mode wherein the brakes are connected to the brake unit to a position closing the connection and the affected wheel brake(s) is connected to the low-pressure supply path of the return pump. In the functional position of these valves assigned to the pressure build-up phases of ASR, the low-pressure supply path of the return pump is shut off from the wheel brake(s) of the brake circuit of the driven vehicle wheels, by means of only a single additional solenoid valve. This ensures that even during normal braking, the safety-related functional elements, namely the outlet non-return valve of the precharging pump and, if appropriate, the ASR outlet valve, are subjected to brake pressure from the brake unit on one side and therefore a leak of these elements can be detected immediately by means of the pedal reaction (the yielding of the brake pedal). This gain in safety achieved is considerable.

For ASR, an ASR control 2/2-way control valve is provided to shut off the main brake line of the brake circuit (II) of the driven vehicle wheels between the brake-pressure regulating valves of the wheel brakes and the brake unit. The basic position O of the ASR control valve its throughflow position and its functional position utilized for ASR control is its shut-off position.

Alternatively to this, a solenoid valve is directly activatable by output signals from an electronic ASR and ABS control unit, which generates activating signals necessary for the activation of the ASR control valve, for the brake-pressure regulating valves and for further solenoid valves of the ASR and of the ABS.

As another alternative, the ASR control valve can be designed as a mechanically controlled valve which, at the onset of the drive-slip control, is changed over to its shutting-off functional position and which otherwise assumes a basic throughflow position intended for braking. Here the mechanical ASR control valve is acted on indirectly, for example as a result of the activation of the precharging pump, the operation of which is controlled by output signals from the electronic control unit.

An advantageously simple design for the mechanical actuation of the ASR control valve can be obtained by a hydromechanical control slide with an actuating piston. The slide is displaceable in a housing and is urged by a restoring spring into its basic open position, providing communication between the outlet-pressure space of the brake unit (assigned to the brake circuit of the driven vehicle wheels) and the main brake line. The piston is equipped with a piston flange which forms with the control-slide housing, a one-sided axial movable limitation of a control-pressure space. The space is subject to the outlet pressure of a precharging pump provided for supplying the return pump. The actuating piston experiences a displacement when connected to the outlet pressure, as a result of which, the ASR control valve assumes its functional closed position to shut off the brake unit from the main brake line of the brake circuit of the driven vehicle wheels. The slide is held in this displaced position as long as the precharging pump is activated.

If there are two isolating valves, one for each of the wheel brakes, each of the wheel brakes can individually or jointly be shut off from or connected to the return line of the brake circuit of the driven vehicle wheels. This affords an increased safety in terms of a checking of the leaking of the functional elements of the ASR.

If these isolating valves are designed as 2/2-way valves which can be activated by output signals from the electronic control unit provided for controlling the anti-lock and drive-slip control phases, then they can act in combination with simple 2/2-way solenoid valves as brake-pressure control valves (both for controlling anti-lock control operations and for controlling drive-slip control operations). This provides a "decoupled" control, in such a way that brake pressure is built up on one wheel brake of the brake circuit of the driven vehicle wheels and brake pressure is reduced on its other wheel brake.

In contrast, if the isolating valves are only jointly activatable and only one further brake-pressure regulating 2/2 way solenoid valve is provided for each of the wheel brakes of the brake circuit of the driven vehicle wheels, then only a "coupled" control is possible during both ABS and ASR. In such an arrangement, changes in brake pressure can be made on one wheel brake at a given time and the other wheel brake normally maintains the hitherto activated brake pressure.

However, if two isolating valves are designed as hydraulically activatable valves which are changed over from their shutting-off basic position O (suitable for the drive-slip control mode) into their throughflow position I (suitable for the non-controlled or controlled braking mode) by outlet pressure of the brake unit, the isolating valves can be jointly activated. They can be designed as mechanically activatable valves which, in comparison with solenoid valves, are of substantially simpler construction and are correspondingly cheaper.

Constructively simple alternative versions for joint actuation of the isolating valves can be obtained as follows. If, as a result of the displacement of a piston of the brake occurring during an actuation thereof, the two isolating valves can be changed over from their shut-off ASP position (O) into their throughflow positions (I) for normal braking mode and for ABS braking, the change-over can take place within a small fraction of the possible total stroke of the brake-unit piston. Alternatively a precharging pump can be provided for supplying brake fluid to the return pump, wherein the two isolating valves are actuatable by means of a hydromechanical control slide. The slide is equipped with an actuating piston which is displaceable in a slide housing and is urged by a restoring spring into its basic position. Here the piston operates the two isolating valves into their basic throughflow ABS position in which the wheel brakes of the brake circuit of the driven vehicle wheels are connected to the return line of this brake circuit. The slide is also equipped with a piston flange, which forms with the control-slide housing, a one-sided axially movable limitation of a control-pressure space. The outlet pressure of the precharging pump is permanently connected to this control-pressure space to cause the actuating piston to be displaced to actuate the two isolating valves into their shut-off ABS positions and to remain held in this functional position as long as the charging pump is activated.

An ASR outlet valve actuated in response to pressure in a line subject to the brake pressure during normal braking or during ABS braking and belonging to the brake circuit of the drive vehicle wheels, can be put in communicating connection with the pressureless brake-fluid reservoir of the brake system for the duration of the pressure reduction phases of the drive-slip control. Otherwise the ASR outlet valve is shut off from the brake-fluid reservoir. This arrangement can be utilized for controlling brake-pressure reduction phases of the drive-slip control and can be inserted into the hydraulic unit of the ABS and ASR in the alternative hydraulic circuit versions such a as: Having ASR outlet valve connected between the return line and the brake-fluid reservoir of the brake system, or connected between the main brake line of the brake circuit assigned to the driven vehicle wheels and the brake-fluid reservoir.

If, the ASR control valve is connected between the main brake line of the brake circuit assigned to the driven vehicle wheels and the brake unit, then the brake-pressure regulating valves can be designed as 2/2-way solenoid valves of simple construction which can be used both as inlet and as outlet valves.

Alternative versions for the design and activation of the ASR outlet valve is obtained when the ASR outlet valve is designed as a solenoid valve which is activatable by means of output signals from the electronic control unit provided for the ABS and the ASR. Alternatively, when a precharging pump is provided for supplying the inlet of the return pump, the ASR outlet valve is designed as a mechanically switchable 2/2-way valve for actuation by a hydromechanical control slide with an actuating piston which engages an actuating member of the outlet valve. The slide is urged by a restoring spring into its basic position in which the ASR outlet valve assumes its basic position O to shut off the return line of the brake circuit of the driven vehicle wheels from the pressureless reservoir of the brake system. Upon subjecting a control-pressure space of the control slide to the outlet pressure of the precharging pump, the slide experiences a displacement and thereby actuates the outlet valve into its functional position (I) connecting the return line to the reservoir.

In this last version there is a first supply control valve for continuing flow from the precharging pump into the pump chamber of the return pump of the brake circuit of the driven vehicle wheels. Simultaneously actuation of the supply control valve with the ASR outlet valve and the ASR control valve can change the position of the supply control valve from its basic position (O), in which the return line is connected via a low-pressure supply line to the outlet side of the outlet non-return valve of the precharging pump, into a functional position (I) in which the outlet side of the outlet non-return valve of the precharging pump is connected directly to the inlet non-return valve of the return pump. A second supply control valve has a basic closed position during a braking mode to shut off the precharging pump from its outlet non-return valve. This second supply control valve is changed over to its functional throughflow ASR position I only after the first supply control valve, the outlet valve, and the ASR control valve have reached their functional ASR positions. This last alternative allows for a low-pressure supply circuit for the return pump of the brake circuit of the driven vehicle wheels. This design is especially favorable in functional terms and ensures that both the ASR control valve and the ASR outlet valve have assumed their functional positions, necessary for the drive-slip control mode, before brake pressure can be built up in a wheel brake subjected to the drive-slip control.

In combination with this, it is advantageous if the second supply control valve can be changed over by means of the control slide and if a control slide surface causes actuation of the second supply control valve by moving past an actuating tappet connected to the second supply valve. The arrangement of the second supply control valve in relation to this control surface is such that the control surface of the actuating piston of the control slide comes into the region of the valve tappet only after any of the ASR control valve, the ASR outlet valve or the first supply control valve are changed over to their functional positions I assigned to ASR. Here the first supply control valve can be designed as a mechanically controlled 3/2-way valve which, as a result of the piston displacement (preferably of the secondary piston of the brake unit occurring during an actuation of the brake unit), is changed over from its basic position assigned to ASR into the functional position provided for the braking mode. This arrangement affords alternative, or joint actuation of supply control valves to allow pressure to be fed into the return pump of the brake circuit of the driven vehicle wheels during ASR.

A safety valve can be connected in parallel with the precharging pump. During an actuation of the brake system, this safety valve is moved out of its shut off basic position into its throughflow position, in which the control-pressure space of the control slide is connected directly to the pressureless brake-fluid reservoir of the brake system. The safety valve is designed as pressure-controlled 2/2-way valve which is activatable by means of the brake pressure generated in the secondary outlet-pressure space of the brake unit. This arrangement guarantees that the brake system responds sufficiently quickly if sudden braking has to take place in a driving situation in which the ASR has been activated and is especially advantageous in terms of the simplicity of its construction.

There is no need for a safety valve of this type if the precharging pump is designed as a gear pump wherein the leakage rate at standstill is very high. Here the control slide provided for actuating the ASR control valve by the outlet pressure of the precharging pump, is relieved of pressure sufficiently quickly when sudden braking has to take place while the ASR is being activated.

The precharging pump can be designed as a precharging further piston pump which is driveable by means of the drive provided for the return pumps and to provide for a simplified construction. This precharging pump should be a self-priming pump and be equipped with a displacement-controlled inlet valve which is moved into its open position when the pump piston is executing the final portion of its suction stroke and the initial portion of its delivery stroke, and which is otherwise shut off.

When a self-priming return pump is used as an ASR auxiliary-pressure source, there is no need for a precharging pump.

A fault detection device which responds to a signal from a first sensor output signal which is a measure of the displacement of a piston of a brake unit occurring as a result of an actuation of the brake system and to a second signal from a second sensor which is a measure of the brake-actuating force occurring as a result of the actuator, can be used to generate an indicator signal characteristic of the proper or the faulty functioning of the brake system. The second sensor output signal is generated by a pressure sensor which monitors the brake pressure occurring in one of the brake circuits of the vehicle. Preferably the brake circuit of the driven vehicle wheel is chosen. Here the brake unit is designed as a tandem master cylinder. The fault detection device comprises two displacement sensors, each monitoring the position of one of the two pistons of the tandem master cylinder and generating electrical output signals characteristic of the piston positions. As a result of a comparative processing of these output signals, the fault generator operates an indicator or warning signals characteristic of the proper or the faulty functioning of the brake system.

Other objects, advantages and novel features of the present invention will become apparent from the following detailed description of the invention when considered in conjunction with the accompanying drawings.

DETAILED DESCRIPTION OF THE DRAWING

Figure 1:
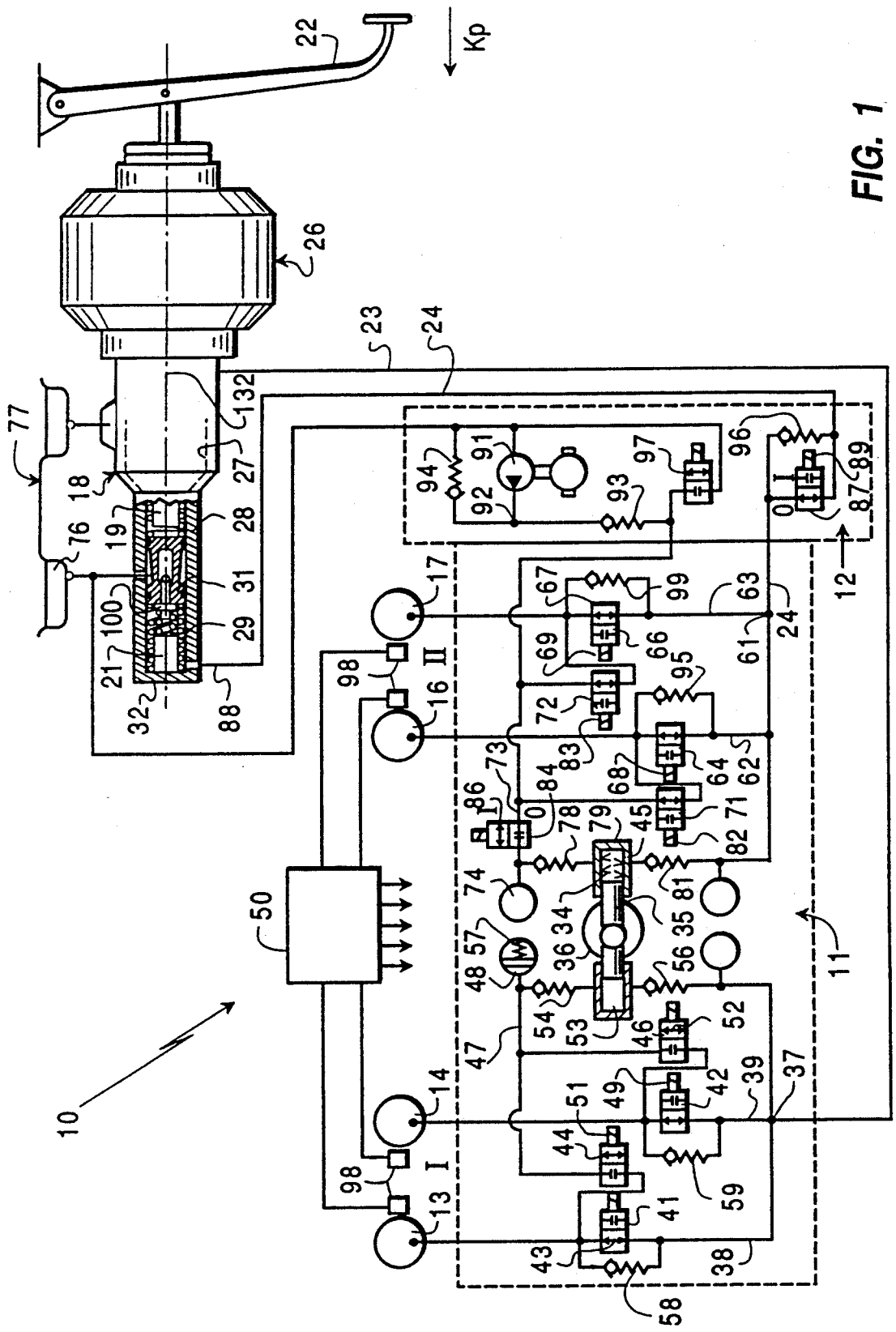
FIG. 1 shows a preferred embodiment of a drive-slip control device according to the invention, with accumulator, isolating, ASR control, ASR outlet, ABS inlet and ABS outlet valves, all designed as solenoid valves.

The hydraulic dual-circuit brake system 10 (FIG. 1) represents a road vehicle braking system which is equipped both with an anti-lock system (ABS) 11 and with a drive-slip control (ASR) 12.

It is assumed, for the purpose of the explanation herein, that the vehicle has a rear-axle drive produced according to current principles of construction and not shown for the sake of simplicity. The output torque of the vehicle engine is distributed via a differential gear (rear-axle differential) to the two rear wheels of the vehicle and it may also be assumed that the wheel brakes 13 and 14 of the left and right front wheels of the vehicle are combined to form a front-axle brake circuit I and the wheel brakes 16 and 17 of the left and right rear wheels of a vehicle are combined to form a rear-axle brake circuit II.

The two brake circuits I and II are designed as static brake circuits which receive their supply of brake pressure from a brake unit 18, which (in the exemplary embodiment illustrated) is designed as a stepped tandem master cylinder of a known type (Alfred Teves GMBH, Brake Manual, 9th edition, 1986, page 73, Bartsch Verlag Ottobrunn bei München), having two outlet-pressure spaces 19 and 21 which are each assigned to one of the two brake circuits I and II under the control of the force $K_p$ by which the driver actuates a brake pedal 22. It is possible to statically build up the front-axle brake pressure $P_{VA}$ and the rear-axle brake pressure $P_{HA}$ in proportion to this force $K_p$ which, via the respective main brake line 23 or 24 of the front-axle brake circuit I and rear-axle brake circuit II, can be fed into their wheel brakes 13, 14 or 16, 17. The brake unit 18 also possesses a pneumatic or hydraulic brake booster 26

The front-axle brake circuit I is connected to the primary outlet-pressure space 19 of the tandem master cylinder 18 and the rear-axle brake circuit II to the secondary outlet-pressure space 21. At the same time, the primary outlet-pressure space 19 is limited fixedly relative to the master cylinder housing 28 by the larger bore step 27 and is movably limited by a primary piston (not shown) which is guided displaceably in a pressure-tight manner in this larger bore step 27 and on which the boosted pedal force acts and by the secondary piston 31 of the tandem master cylinder 18, designed as a floating piston, guided displaceably in a pressure-tight manner in the spatially smaller bore step 29 of the master-cylinder housing 28. As seen in the axial direction, the secondary outlet-pressure space 21 is movably limited by the secondary piston 31 and fixedly relative to the housing by the end wall 32 of the master-cylinder housing 28.

The ABS 11 works, both on the front-axle brake circuit I and on the rear-axle brake circuit II, according to the so-called return-flow principle, by which (during brake-pressure reduction phases of the anti-lock control) brake fluid is bled from one or more of the wheel brakes 13, 14, 16, 17 and is pumped back into that outlet pressure space 19 or 21 of the master cylinder 18 assigned to the particular brake circuit I or II.

To accomplish this, there is a return piston pump 33, 34 for each of the two brake circuits I and II. The pumps 33, 34 have a common electrically controllable pump drive 36 designed as an eccentric drive.

Two brake-line branches 38 and 39 extend from a branching point 37 of the main brake line 23 of the front-axle brake circuit I and provide flow paths for feeding brake pressure into the wheel brakes 13 and 14 of the front-axle brake circuit I during "normal" braking, (i.e. braking not subjected to an anti-lock control). The two branches 38 and 39 each have an inlet valve 41, 42 which, as long as the ABS 11 on the front axle has not responded, assume their illustrated basic throughflow positions O in which the wheel-brake cylinders of the front-wheel brakes 13 and 14 are connected to the main brake line 23 of the front-axle brake circuit I via a throughflow path 43 of the respective inlet valve 41, 42. Thus, in the basic positions O of these inlet valves 41 and 42, brake pressure can be both built up and reduced by an appropriate actuation of the brake unit 18.

Furthermore, the wheel-brake cylinders of the front-wheel brakes 13 and 14 are each connected via outlet valves 44, 46 to a return line 47 leading to a buffer low-pressure accumulator 48. During pressure reduction phases of the anti-lock control, this connection allows a rapid relief of pressure before the return pump 33 can convey the bled-off brake fluid back into the brake unit.

The outlet valves 44 and 46 of the front-axle brake circuit I assume their basic shut-off positions O, which as long as the ABS on the front axle has not responded, shuts off the front-wheel brake 13 or 14 from the return line 47 of the front-axle brake circuit I.

In the exemplary embodiment illustrated, the inlet valves 41 and 42 of the front-axle brake circuit I are designed as 2/2-way solenoid valves which, whenever their switching magnets 49 are each activated by means of an output signal from an electronic control unit 50 (provided both for the functional control of ABS 11 and for the functional control of the ASR 12), can be moved individually or jointly, depending on whether the control is to take effect on only one or both front wheels, into their energized shut off position I, in which the wheel brake or wheel brakes 13 and/or 14 of the front-axle brake circuit I (which are subjected to the control) are shut off from the main brake line 23.

In the exemplary embodiment illustrated, the outlet valves 44 and 46 of the front-axle brake circuit I are also designed as 2/2-way solenoid valves which, as a result of the energization of each of their control magnets 51 by means of a control output signal from the electronic control unit 50, can be moved individually or jointly (depending on the front-wheel brake 13 and/or 14 on which the ABS 11 responds) out of their basic shut-off position O into their energized throughflow positions I. Here the wheel brake or wheel brakes 13 and/or 14 (subjected to the control) have a brake-pressure reduction since they are connected to the return line 47 of the front-axle brake circuit I via the throughflow path 52 of the respective outlet valve 44 and 46.

The pump chamber 53 of the return pump 33 of the front-axle brake circuit I, which is activated together with the return pump 34 of the rear-axle brake circuit II whenever the ABS 11 responds, is connected to the return line 47 via an inlet non-return valve 54 and to the main brake line 23 of the front-axle brake circuit I via an outlet non-return valve 56. The inlet non-return valve 54 is subjected in the opening direction to a relatively higher pressure in the return line 47 (or in the low-pressure accumulator 48 connected to it) as compared to the pressure than in the pump chamber 53 and is held in its shut-off position by means of a relatively higher pressure in the pump chamber 53 than in the return line 47 or the low-pressure accumulator 48. The outlet non-return valve 56 of the return pump 33 of the front-axle brake circuit I is subjected in the opening direction to a relatively higher pressure in the pump chamber 53 of this return pump 33 than in the connected main brake line 23 and is held in its shut-off position by means of a relatively higher pressure in the main brake line 23 than in the pump chamber 53.

The low-pressure accumulator 48, assuming this is designed as a piston-spring accumulator, is typically constructed so that the prestress of its accumulator spring 57 is equivalent to an accumulator pressure of, for example, 4 to 6 bars and, when the holding capacity of the low-pressure accumulator 48 is fully utilized, is approximately equivalent to a pressure of 10 bars.

Whenever the ABS 11 responds, its two return pumps 33 and 34 are activated for the entire duration of the particular control cycle. By closing an inlet valve 41 and 42 and opening a corresponding outlet valve 44 and 46, the individual front-wheel brakes 13 and 14, can be "decoupled", wherein wheel control to effect brake-pressure reduction, brake-pressure holding and brake-pressure rebuild-up phases can be obtained for the two front-wheel brakes 13 and 14 of the front vehicle axle independently of one another.

In order to obtain a brake-pressure reduction phase on the left front-wheel brake 13 for example, the inlet valve 41 is moved into its energized shut-off position I, and outlet valve 44 is likewise moved into its energized throughflow position I.

To achieve a brake-pressure holding phase for the wheel-brake cylinder of the front-wheel brake 13 in question its pressure is held at the value then obtained when the inlet valve is held in its energized shut-off position I and the outlet valve 44 in its basic shut-off position O.

Brake-pressure build-up phases are obtained by moving the inlet valve 41 and the outlet valve 44 of the front-wheel brake 13 in question into their basic positions O, which are also assigned to normal braking (that is to say braking not subjected to a control).

The same applies to the corresponding control phases on the right front-wheel brake 14 in respect of its inlet valve 42 and outlet valve 46.

So far as has been explained hitherto for the front axle, the ABS 11 corresponds in terms of construction and functioning to known anti-lock systems working on the return-flow principle.

It goes without saying that for each of the two front-wheel brakes 13 and 14 there could be (instead of the 2/2-way inlet and outlet valves 41, 44 and 42, 46 assigned) a 3/3-way solenoid valve (not shown) specifically having, as a basic position O, a throughflow position in which the respective wheel brake 13 or 14 is connected to the main brake line 23 of the front-axle circuit, but is shut off from the return line 47. This 3/3-way valve would have a first energized shut-off position, in which the respective wheel brake 13 or 14 is shut off both from the main brake line 23 of the front-axle brake circuit I and from its return line 47 and a second energized pressure-reduction or return position in which the respective wheel brake 13 or 14 is connected to the return line 47 of the front-axle brake circuit I and is shut off from its main brake line 23.

For the sake of completeness, it may also be mentioned that the non-return valves 58 and 59, which are provided in a parallel connection with the inlet valves 41 and 42 of the two front-wheel brakes 13 and 14 and which are subjected in the opening direction to a relatively higher pressure in the respective front-wheel brake 13 or 14 than in the main brake line 23, have the purpose of allowing a rapid brake-pressure reduction when the pedal-actuating force is eased.

The hydraulic functional part of the ABS 11 (provided for the anti-lock control on the rear-wheel brakes 16 and 17) is similar in terms of construction and mode of operation to its functional part provided for the brake-pressure control on the front-wheel brakes 13 and 14.

In the rear-axle brake circuit II, the brakeline branches 62 and 63 extend from a branching point 61 of the main brake line 24 of the rear-axle brake circuit II for feeding brake pressure into the wheel brakes 16 and 17 of the rear-axle brake circuit II whenever the rear-wheel brakes 16 and 17 are activated. Whenever the drive-slip control 12 responds, an inlet valve 64, 66 designed as a 2/2-way solenoid valve moves to the illustrated basic throughflow position O in which the rear-wheel brakes 16 and 17 are connected to the main brake line 24 of the rear-axle brake circuit II via the throughflow paths 67 of the two valves. The inlet valves 64 and 66 of the rear-axle brake circuit II (as a result of the energization of their control magnets 68 and 69 by means of output signals from the electronic control unit 50 provided both for the functional control of the ABS 11 and for that of the ASR 12) are movable into their energized shut-off position I, individually or jointly, depending on the particular vehicle wheel on which the respective control is to take effect. Furthermore, the wheel-brake cylinders (not shown) of the rear-wheel brakes 16 and 17 are also each connected via an outlet valve 71 or 72 to a return line 73 of the rear-axle brake circuit II (during response of the anti-lock system 11 on the rear axle) to allow brake fluid to flow off to the low-pressure or buffer accumulator 74 during brake-pressure reduction phases of the anti-lock control. This operation corresponds in constructional and functional terms to the buffer accumulator 48 of the front-axle brake circuit I, of the rear-axle brake circuit II and to its return pump 34.

This buffer accumulator 74 is connected via an inlet non-return valve 78 (corresponding in constructional and functional terms to the inlet non-return valve 54) to the pump chamber 79 of the return pump 34 of the rear-axle brake circuit II, which, via the outlet non-return valve 81 (corresponding in constructional and functional terms to the outlet non-return valve 56 of the front-axle brake circuit I) is connected to the main brake line 24 of the rear-axle brake circuit II.

In the exemplary embodiment illustrated, the outlet valves 71 and 72 of the rear-axle brake circuit II are designed as 2/2-way solenoid valves like those of the front-axle brake circuit. They can be changed over individually or jointly into their respective energized position I as a result of the energization of their control magnets 82 and 83 by means of output signals from the electronic control unit 50. In contrast to the front-axle brake circuit I, however, the basic position O of the outlet valves 71 and 72 of the rear-axle brake circuit II is their respective throughflow position, while the energized position I is their shut-off position. The combination of the inlet and outlet valves 64, 71 and 66, 72 assigned to the wheel brakes 16 and 17 (utilized for brake-pressure reduction, brake-pressure holding and brake-pressure rebuild-up phases of the anti-lock control, of shut-off and/or throughflow positions) can—in the case of single wheel control—be the same as in an anti-lock control on the front-wheel brakes 13 and 14.

During normal braking (braking not subjected to an anti-lock control) in order to prevent the buffer accumulator 74 of the rear-axle brake circuit II from receiving brake fluid thereby resulting in a lengthening of the pedal-actuating travel, there is an accumulator isolating valve 84 for the return line 73 of the rear-axle brake circuit II. The isolating valve 84 is in communicating connection with the wheel-brake cylinders of the rear-wheel brakes 16 and 17 via the outlet valves 71 and 72 open in their basic position O. In a basic position O of the isolating valve 84, the return line 73 of the rear-axle brake circuit II is shut off from its low-pressure accumulator 74 and from the inlet non-return valve of the return pump 34 of the rear-axle brake circuit II.

In the exemplary embodiment illustrated, this accumulator isolating valve 84 is designed as a 2/2-way solenoid valve which is movable by an output signal from the electronic control unit 50 into its energized throughflow position I. Here the return line 73 is connected, via the throughflow path 86 of the valve 84, to the buffer accumulator 74 or the inlet side of the inlet non-return valve 78 of the return pump 34 of the rear-axle brake circuit II. The accumulator isolating valve 84 is switched into its throughflow position I both for the duration of an anti-lock control mode and for the duration of a drive-slip control mode. The functional components of the ABS 11 thus far explained essentially with reference to the anti-lock control on the wheel brakes 16 and 17 of the driven vehicle wheels, are also utilized for the drive-slip control (ASR) which works on the principle of decelerating a vehicle wheel tending to spin by activating its wheel brake 16 or 17 until its drive slip remains within a value range compatible both with good propulsive acceleration and with sufficient driving stability.

The return pump 34 of the ABS 11 is utilized as an auxiliary-pressure source in the event of a response of the drive-slip control. The brake pressure is supplied to the wheel brake 16 or 17 of the vehicle wheel, tending to spin, via the inlet valve 64 or 66 into the left and/or right rear-wheel brake 16 and/or 17.

Furthermore, to provide the ASR 12, there are the functional components which are explained hereafter essentially in terms of their functioning and from the knowledge of which, their construction would be obvious to an average person skilled in the art.

That portion of the main brake line 24 which leads from the secondary outlet-pressure space 21 of the brake unit 18 to the branching point 61 of the main brake line 24 of the rear-axle brake circuit II, can be shut off by means of an ASR control valve 87 which is connected between the rear-axle brake-pressure outlet 88 of the brake unit 18 and the said branching point 61, to which the outlet side of the outlet non-return valve 81 of the return pump 34 is also connected.

This ASR control valve 87 is designed as a 2/2-way solenoid valve, the basic position O of which it is its throughflow position and in which the rear-axle brake pressure outlet 88 of the brake unit 18 is connected to the main brake line 24 of the rear-axle brake circuit II branching off towards the wheel brakes 16 and 17.

Whenever the ASR 12 responds, the control magnet 89 is energized by an output signal from the electronic control unit 50 for the duration of activation of the ASR 12 and the ASR control valve 87 is changed over into its shut-off position I, so that the brake unit 18 is thereby uncoupled from the rear-axle brake circuit II.

As a further functional element of the ASR 12, there is a precharging pump 19 which is driven electrically under the control of output signals from the electronic control unit 50. The precharging pump 19 conveys brake fluid out of chamber 76 of the brake-fluid reservoir 77 of the brake system 10 assigned to the rear-axle brake circuit II to the return line 73 and from there through an open accumulator isolating valve 84 into the pump chamber 79 of the return pump 34 of the rear-axle brake circuit II. For this, the delivery outlet 92 of the precharging pump 91 is connected to the return line 73 via an outlet non-return valve 93. This outlet non-return valve 93 is subjected (in the opening direction) to a relatively higher outlet pump pressure than the low-pressure accumulator 74 of the return line 73 of the rear-axle brake circuit II and is otherwise shut off.

The outlet pressure and delivery of the recharging pump 91 are each calculated sufficiently high to ensure that a stream of brake fluid is conveyed from the precharging pump 91 or the buffer accumulator 74 to the return pump 34 (while it is working as a brake-pressure source in the ASR mode) and cannot "break away". The outlet-pressure level of the precharging pump 91 is defined by a pressure-limiting valve 94 which is shown as a non-return valve and which is connected in parallel with the precharging pump.

Like the return pump 33 of the front-axle brake circuit I, the return pump 34 of the rear-axle brake circuit II is designed as a piston pump. So that the return pump 34 of the rear-axle brake circuit II can convey brake fluid into this brake circuit, it is necessary to have a minimum inlet pressure which is guaranteed by the precharging pump 91.

Since, on the assumption of a sufficiently high-power drive 36, a piston pump can generate an outlet pressure which can be substantially higher than the maximum pressure necessary for subjecting the rear-wheel brakes 16 and 17 to a requisite brake pressure, it is also necessary to limit the outlet pressure of the return pump 34 of the rear-axle brake circuit II. In the exemplary embodiment illustrated, a pressure-limiting valve 96 is arranged in a hydraulic parallel connection with the ASR control valve 87 for this purpose. That is, pressure limiting valve 96 is connected between the branching point 61 of the main brake line 24 and the delivery outlet 88 of the brake unit 18.

Since in a driving situation in which the ASR 12 responds, the brake system 10 is not actuated, and consequently the secondary piston 31 of the brake unit 18 is in its basic position in which the secondary outlet-pressure space 21 is in communicating connection with the brake-fluid reservoir 76, 77 via a central valve 100 of conventional design or via a follow-up bore, if the outlet pressure of the return pump 34 exceeds the maximum permissible limiting value (of for example, 200 bars) brake fluid can flow off via the pressure-limiting valve 96 into that chamber 76 of the brake-fluid reservoir 77 assigned to the rear-axle brake circuit II.

Furthermore, within the framework of the ASR 12 there is an ASR outlet valve 97 which is connected between the return line 73 of the rear-axle brake circuit II and the chamber 76 of the brake-fluid reservoir 77 of the brake system 10. This ASR outlet valve 97 is designed as a 2/2-way solenoid valve which can be changed over between a shut-off position O and a throughflow position I. The basic shut-off position O of this ASR outlet valve 97 allows the return line 73 of the rear-axle brake circuit II to be shut off from the chamber 76 of the brake-fluid reservoir 77. Its energized throughflow position I (assumed when it is activated by means of an output signal from the electronic control unit 50) provides a connection between the return line 73 and the brake-fluid reservoir 77. This outlet valve 97 is utilized for controlling brake-pressure reduction phases of the drive-slip control.

On the rear-axle brake circuit II, during normal braking (braking not undergoing a brake-pressure control), the brake system 10 works as follows:

In the basic position of the: inlet valves 64 and 66, outlet valves 71 and 72, accumulator isolating valve 84, ASR control valve 87 and ASR outlet valve 97 assigned to this braking mode, the rear-axle brake pressure $P_{HA}$ built up by the brake unit 18. Brake fluid from secondary outlet-pressure space 21 can be fed into the rear-wheel brakes 16 and 17 via the open ASR control valve 87 and via the inlet valves 64 and 66 located in their throughflow position O. This brake fluid is also fed via the outlet valves 71 and 72 (positioned in their throughflow positions O) into the return line 73 which, however, is shut off from both the buffer accumulator 74 and the return pump 34 by means of the accumulator isolating valve 84 (located in its shut-off position O) and from the brake-fluid reservoir 77 of the brake system 10 by means of the ASR outlet valve 97 (likewise located in its shut-off position).

During any normal braking operation, subjecting the return line 73 of the rear-axle brake circuit II to pressure, provides a leak check of the outlet non-return valve 93 of the precharging pump 91 and a leak check of the ASR outlet valve 97, since a leak in these safety-relevant valves 93 and/or 97 can easily be detected from a yielding of the brake pedal 22. This check is important because, in the event of a simultaneous failure of the front-axle brake circuit, such a leak could lead to a complete failure of the brake system and this would be unacceptable.

It goes without saying that the feeding of brake pressure into the return line (shut off from the buffer accumulator 74 by the isolating valve 84 and from the brake-fluid reservoir 77 by the ASR outlet valve 97) can also take place via only one of the two outlet valves 71 or 72. In this case, the basic position of the other outlet valve 72 or 71 is its shut-off position, similarly as provided for the outlet valves 44 and 46 in the front-axle brake circuit I.

In order to explain anti-lock and drive-slip control cycles which can be carried out on the driven rear wheels of the vehicle, a typical anti-lock control cycle on the right rear wheel of the vehicle represented by the wheel brake 17 may be considered first. The initial assumption is that the anti-lock control works in the manner of a single-wheel control.

During a controlled or non-controlled braking operation, the ASR control valve 87 and the ASR outlet valve 97 remain held in their basic position O. That is, the ASR control valve 87 is in its throughflow basic position O and the ASR outlet valve is in its basic shut-off position O.

If a tendency to locking occurs during braking on the right rear wheel brake 17, this is first counteracted by an introductory brake-pressure reduction phase. For this, simultaneous valve actuations occur with the inlet valve 66 of the right rear-wheel brake 17 being moved into its shut-off position, the accumulator isolating valve 84 into its throughflow position and the outlet valve 71 of the left rear-wheel brake 16, initially not subjected to a control, likewise into its shut-off position I. The outlet valve 72 of the right rear-wheel brake 17 remains in its throughflow position O, as does the inlet valve 64 of the left rear-wheel brake. Simultaneously or, as a precaution, somewhat earlier (that is to say as soon as the electronic control unit 50 detects the onset of a tendency to locking) the drive 36 of the return pumps 33 and 34 is also cut in. Via the still open outlet valve 72 of the right rear-wheel brake 17, brake fluid (under the brake pressure reached until then) flows off from the wheel brake 17 via the return line 73 and the now open accumulator isolating valve 84, and, insofar as it is not partially pumped directly back into that outlet-pressure space 21 of the brake unit 18 by the return pump 34 of the rear-axle brake circuit II, is first received by the buffer accumulator 74 of the rear-axle brake circuit II and thereafter, in further conveying strokes of the return pump 34, is returned completely into the rear-axle outlet-pressure space 21 of the brake unit 18. A resultant pulsating rearward movement of the brake pedal 22 (counter to the actuating force $K_p$) gives the driver an expedient warning of the activation of the ABS 11.

During the pressure-reduction phase on the right rear-wheel brake 17, the brake pressure can continue to be increased on the left rear-wheel brake via the still open inlet valve 64 of the latter. A brake-pressure control in "phase opposition" is therefore possible on the rear wheels of the vehicle.

As soon as an ending of the tendency to lock on the right rear wheel occurs as a result of the pressure-reduction phase of the anti-lock control, the outlet valve 72 is changed over to its shut-off position I, with the result that the brake-pressure valve (obtained until then by means of the control) is initially maintained on the wheel brake 17 of the rear wheel previously tending to lock. If the tendency to lock thereupon increases again, the outlet valve 72 of the right rear-wheel brake 17 is once again switched back into its throughflow position O, thereby further lowering the brake pressure in the rear-wheel brake 17.

If the tendency to lock disappears permanently, the brake pressure on the right rear-wheel brake 17 is once more built up in steps because now, with the outlet valves 71 and 72 continuing to remain closed, the inlet valve 66 of the wheel brake 17 undergoing the control is periodically changed over between its shut-off position I and its throughflow position O, until finally, the outlet pressure prevailing in the outlet pressure space 21 of the brake unit 18 is once more fed in the full amount into the right rear-wheel brake 17. Even during the brake-pressure rebuild-up phase concluding the anti-lock control cycle, the accumulator isolating valve 84 remains held in its open position and is switched back into its shutting-off basic position only at the conclusion of the brake-pressure rebuild-up phase. Simultaneously with this at the earliest, and as a rule only after a short safety interval within which a tendency to lock has no longer occurred, the return-pump drive 36 is then also cut out again.

It goes without saying that the anti-lock control on the rear axle can also be carried out, to the effect that, when the brake pressure on one of the two rear-wheel brakes 16 or 17 is lowered, the brake pressure on the other wheel brake 17 or 16 is then no longer increased, but held at the value reached by the change-over of the respective inlet valve 64 or 66 into its shut-off position. Alternative is, whenever a wheel tends to lock, a control is carried out in the same direction on both wheel brakes in the manner of the so-called select-low principle, as a result of which (although at the expense of ideal braking deceleration), the best possible dynamic stability of the vehicle during a braking operation subjected to the anti-lock control is achieved.

In contrast to this of course, the drive-slip control (ASR) function requires a "single-wheel control", in that there is an activation of the wheel brake 16 or 17 of only that wheel which tends to spin or there is a simultaneous activation of the two rear-wheel brakes 16 and 17 only when both vehicle wheels tend to spin. In this situation, the output torque of the vehicle drive unit (not shown) is also lowered.

For the explanation of the ASR 12 which now follows, it may be assumed as a typical example, that there is a starting situation in which the drive-slip control begins on the right rear wheel, since this is located on an icy surface and therefore tends to spin, whereas the left rear wheel can roll on a relatively dry roadway region with a good grip. As soon as a limiting value of the drive slip of the right rear wheel of, for example 30% is reached or exceeded, the drive slip $\lambda_A$ being given by the relation $$\lambda_A = (V_R - V_F)/V_R$$

in which $V_R$ denotes the wheel circumference speed of the vehicle wheel in question and $V_F$ denotes the vehicle speed or a reference speed representing this approximately, then the ASR control valve 87 is changed over to its shut-off position I, the inlet valve 64 of the rear wheel not tending to spin is changed over to its shut-off position I, the accumulator isolating valve 84 is changed over to its throughflow position, and the precharging pump 91 and the return-pump drive 36 are cut in.

This results in brake outlet pressure from the return pump 34 of the rear-axle brake circuit II being fed into the wheel brake 17 of the vehicle wheel tending to spin.

As soon as the selected vehicle wheel has its tendency to spin decreased because its wheel brake 17 is subjected to pressure and this vehicle wheel is thus necessarily decelerated, the inlet valve 66 is first changed over to its shut-off position I, in order for a limited period of time to keep the brake pressure fed into the wheel brake 17 at the value then reached. This change-over of the inlet valve 66 takes place even before the tendency of the rear wheel to spin has disappeared completely. That is, even before its drive slip has fallen below a threshold value. Only after the falling below of the threshold valve can it be again assumed that a propulsion force of a desired extent can be transmitted to the vehicle via the vehicle wheel subjected to the control and at the same time guarantee a good driving stability. If, despite the now constant brake pressure prevailing in the rear brake 17, the tendency to spin of the vehicle wheel hitherto subjected to the control increases again, then the inlet valve 66 of this wheel brake 17 is once more switched back into its throughflow position O and the brake pressure in the wheel brake 17 is thereby further increased.

If the tendency of the right rear wheel to spin thereafter disappears permanently, this being detected by the electronic control unit 50 from the fact that the drive slip $\lambda_A$ of the vehicle wheel in question falls below a lower limiting value compatible both with good driving stability and with a sufficient propulsion transmission capacity, the brake pressure in the right rear-wheel brake 17 has to be reduced. Accordingly the outlet valve 72 of the right rear-wheel brake is switched back into its throughflow position O, and the ASR outlet valve 97 is changed over to its throughflow position so that the pressure can be relieved towards the brake-fluid reservoir. If, in the meantime, the left rear wheel has assumed a tendency to spin, then by opening its inlet valve 64 the brake pressure can be built up in the rear-wheel brake 16, while at the same time the brake pressure can be lowered on the right rear-wheel brake 17. It goes without saying that brake-pressure holding and brake-pressure reduction phases on the left rear-wheel brake 16 can be controlled in the same way as the right rear-wheel brake 17. That is, irrespective of which particular control phase taking place on the other respective wheel brake. Finally, the concluding reduction of the brake pressure on the two rear-wheel brakes 16 and 17 is obtained by changing over the ASR outlet valve 97 to its energize throughflow position I, and by cutting out the precharging pump 91 and the return-pump drive 36. A residual brake pressure still present in one of the wheel brakes 16 and/or 17 can then be relieved completely towards the brake fluid reservoir 77 of the brake system 10 when the ASR outlet valve 97 is in the open position.

Finally, the control is ended by switching all the valves back into their "neutral-control" basic positions provided for normal braking, insofar as they have not already assumed their basic positions again.

The control signals required for the appropriate activation: of the inlet valves 41, 42, and 64, 66 and outlet valves 44, 46 and 71, 72 of both the front-axle brake circuit I and the rear-axle brake circuit II, of the accumulator isolating valve 84, of the ASR control valve 87, of the ASR outlet valve 97 of the rear-axle brake circuit II, of the return pumps 33 and 34 and, if appropriate, of the precharging pump 91 for the anti-lock control mode and for the drive-slip control mode on the rear axle, are all obtained from the electronic control unit 50 provided jointly for ABS 11 and ASR 12 control. This control is as a result of a processing carried out according to criteria known per se, utilizing output signals from wheel-speed sensors 98 which are respectively assigned individually to the non-driven and the driven vehicle wheels and which generate (according to a level and/or a frequency) electric output signals which are characteristic of the wheel circumference speeds of the individual vehicle wheels and of which the changes in time also contain information on the acceleration behavior and deceleration behavior of the individual vehicle wheels.

It is assumed that an average person skilled in the art and familiar with the conventional control algorithms of an anti-lock and a drive-slip control will find it possible to produce the electronic control unit 50 ensuring an appropriate activation of the above-explained functional elements of the ABS 11 and ASR 12 based on common knowledge and without inventions. These controls operate in dependence on threshold valves of the brake slip or drive slip and/or of the wheel circumference decelerations and accelerations, and there is therefore, no need for an explanation of the electronic control unit 50 which goes into the details of electronic circuit technology.

For the sake of completeness, it may also be mentioned that non-return valves 95 and 99 (connected in parallel with the inlet valves 64 and 66 of the rear-axle brake circuit II and corresponding in functional terms to the non-return valves 58 and 59 of the front-axle brake circuit I) are also provided.

In the embodiments of FIGS. 2 to 19, further exemplary embodiments of the anti-lock and anti-slip control device according to the invention are explained. Constructional and functional elements of these control devices, insofar as they are identical or equivalent in constructional and functional elements of the control devices explained with reference to FIG. 1, are given the same respective reference symbols as the corresponding elements of FIG. 1. Furthermore, for the sake of simplicity in the representation, FIGS. 2 to 19 do not show the electronic control unit 50 and the wheel-speed sensors intended for monitoring the movement behavior of the vehicle wheels. Insofar as elements in FIGS. 2 to 19 bear reference symbols similar to FIG. 1 and without these elements being mentioned specifically, this is intended to imply a reference to the description of the identically designated constructional and functional elements which was given in relation to FIG. 1.

Figure 2:
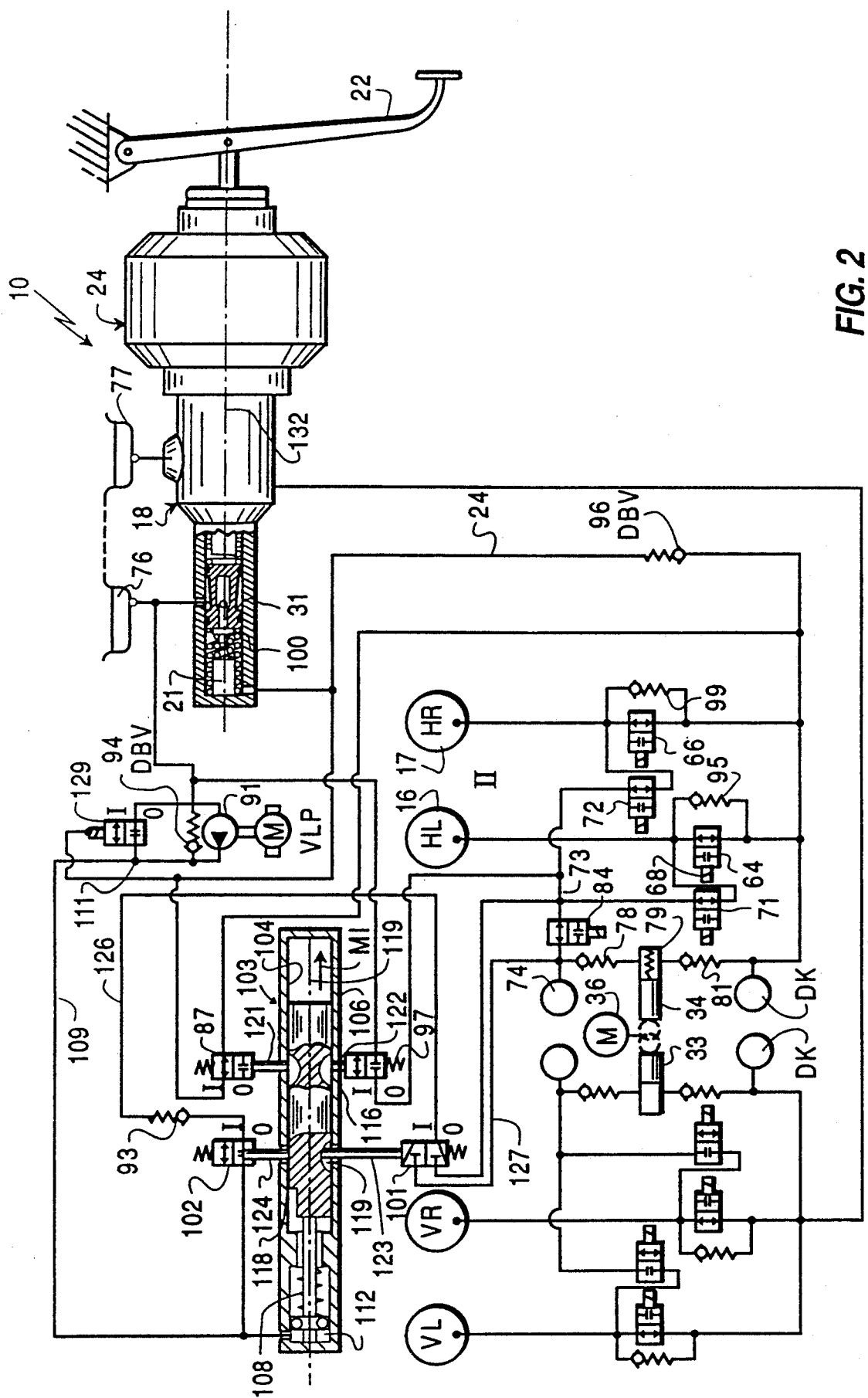
FIG. 2 shows a second embodiment wherein the ASR control, ASR outlet and supply control valves can be changed over in an appropriate combination by means of a hydromechanical control slide and which are changed over whenever the ASR is activated.

The embodiment according to FIG. 2, differs from that according to FIG. 1 in that the ASR control valve 87 is switched from its throughflow position O to its shut-off position I during the ASR mode. That is the secondary outlet-pressure space 21 of the brake unit 18, assigned to the brake circuit II of the driven vehicle wheels, is shut off from its main brake line 24 and the ASR outlet valve 97 (in the basic shut-off position O) shuts off the return line 73 connection of the rear-axle brake circuit II from the chamber 76 of the brake-fluid reservoir 77 of the brake system 10. In the energized position I of ASR outlet valve 97, the return line 73 of the rear-axle brake circuit II is connected to this chamber 76 of the brake-fluid reservoir 77. The ASR control valve 87 and the ASR outlet valve 97 are both designed as mechanically actuable 2/2-way valves which are jointly switchable. A control slide 103 is provided to actuate the ASR control valve 87, the ASR outlet valve 97, a first mechanically switchable supply control valve 101, and a second mechanically switchable supply control valve 102, in order to obtain brake-pressure build-up phases of the drive-slip control. Brake fluid is fed by the precharging pump 91 into the pump chamber 79 of the return pump 34 of the brake circuit II of the driven vehicle wheels via the two control valves 101 and 102, driven to an open position by control slide 103. This control slide 103 has an actuating piston 107 displaceably arranged in a longitudinal bore 104 of a control-slide housing 106 and urged by a restoring spring 108 into its illustrated basic position. In the basic position, the ASR control valve 87, the ASR outlet valve 97 and the two supply control valves 101 and 102 assume their illustrated basic positions O. The control slide 103 is moved to the right (arrow 113) by subjecting its control-pressure space 112 to the delivery outlet 111 of the precharging pump 91 via a control line 109 and counter to the restoring force of the spring 108. When the control-pressure space 112 is relieved of pressure, the slide 103 once again moves back into its illustrated basic position as a result of the effect of the restoring spring 108. The first supply control valve is designed as a 3/2-way valve which, in the event of a displacement of the actuating piston 107, is changed over simultaneously with the ASR control valve 87 and the ASR outlet valve 97. The second supply control valve 102 is designed as a 2/2-way valve which, in the event of a displacement of the actuating piston 107 in the direction of the arrow 113, is changed over from its illustrated basic position O to its energized functional position I in a delayed manner with respect to the: ASR control valve 87, the ASR outlet valve 97, and the first supply control valve 101. The simultaneity or sequence of the change-over operations is determined by the arrangement of ramp-shaped control surfaces 114, 116, 117 and 118 of the actuating piston and by the arrangement of displaceable control tappets 121, 122, 123 and 124, which are provided for actuating the said valves 87, 97, 101 and 102. The control tappets 121, 122, 123, and 124 extend radially relative to the longitudinal axis 119 of the control slide 103 and are slideably supported on the control surfaces 114, 116, 117 and 118 (or on the casing of the actuating piston 107) and are biased against the control surface 114, 116, 117 by the valve springs of valves 87, 97, 101 and 102.

The second supply control valve 102 is connected between the delivery outlet of the precharging pump 91 and a low-pressure supply line 126 which leads to the first supply control valve 101. In the shown basic position O of this first supply control valve, (assigned to normal braking and braking undergoing an anti-lock control), the low-pressure supply line 126 is connected to the return line 73 of the rear-axle brake circuit II through control valve 101 and is shut off from a low-pressure supply line 127 leading from the first supply control valve 101 to the low-pressure accumulator 74 of the rear-axle brake circuit II. In the functional ASR mode position I, the low-pressure supply line 126 is connected to the low-pressure supply line 127 leading to the low-pressure accumulator 74 of the rear-axle brake circuit II and is shut off from the return line 73 of the rear-axle brake circuit II. The low-pressure supply line 126 contains a non-return check valve 93 which is shut off by a relatively higher pressure in that portion of the low-pressure supply line 126 connected to the first supply control valve 101 than in its portion connected directly to the second supply control valve 102. The closing force of the valve spring of this non-return check valve 93 is equivalent to a lower pressure than the outlet pressure of the precharging pump 91.

The shown basic shut-off position O of the second control valve 102 occurs during normal braking and braking undergoing an anti-lock control and shuts off the delivery outlet of the precharging pump 91 from the low-pressure supply line 126. Its function throughflow position I occurs during drive-slip control mode to connect the outlet of the precharging pump 91 to the low-pressure accumulator 74 or to the pump chamber 79 of the return pump 34 of the rear-axle brake circuit II via the inlet non-return valve 78.

The anti-lock system 11 of the brake system of FIG. 2 is entirely similar in functional terms to the ABS 11 of the brake system of FIG. 1 in that in the anti-lock control mode, the return line 73 of the rear-axle brake circuit II is connected to the low-pressure accumulator 74, or the return pump 34, of the rear-axle brake circuit II via the energized accumulator isolating valve 84.

However, in contrast to the brake system 10 according to FIG. 1, this accumulator isolating valve 84 remains in its shut-off basic position O both during normal braking and during the drive-slip control mode. Thus in the drive-slip control mode and for the entire duration of which the precharging pump 91 is activated, brake-pressure build-up, brake-pressure holding and brake-pressure reduction phases are controlled solely by means of the inlet valves 64 and 66 and the outlet valves 71 and 73.

After the conclusion of a drive-slip control cycle, the control pressure prevailing in the control-pressure space 112 is reduced and the actuating piston 107 of the control slide 103 is pushed back sufficiently quick to its basic position by spring 108. Here the ASR control valve 87, the ASR outlet valve 97, the first supply control valve 101 and the second supply control valve 102 assume the basic positions necessary for normal braking. It is necessary to design the precharging pump 91 so that after its stopping, it provides a sufficiently large flow of leakage oil back to the chamber 76 of the brake-fluid reservoir 77. Designing the precharging pump 91 as a gear pump is suitable for this purpose.

To ensure, that braking can always be carried out on the rear axle and with a drive-slip control cycle taking place, requires that the control slide 103 to be very quickly brought into its functional position necessary for normal braking. To that end there is a brake-pressure-controlled 2/2-way bypass valve 129, which is actuated by the brake pressure built up in the secondary outlet-pressure space 21 of the brake unit 18 to change over from its basic shut-off position O to its throughflow position I in which the control-pressure space 112 of the control slide 113 is connected directly to the brake-fluid reservoir 77 of the brake system 10 via the control line 109.

Figure 3:
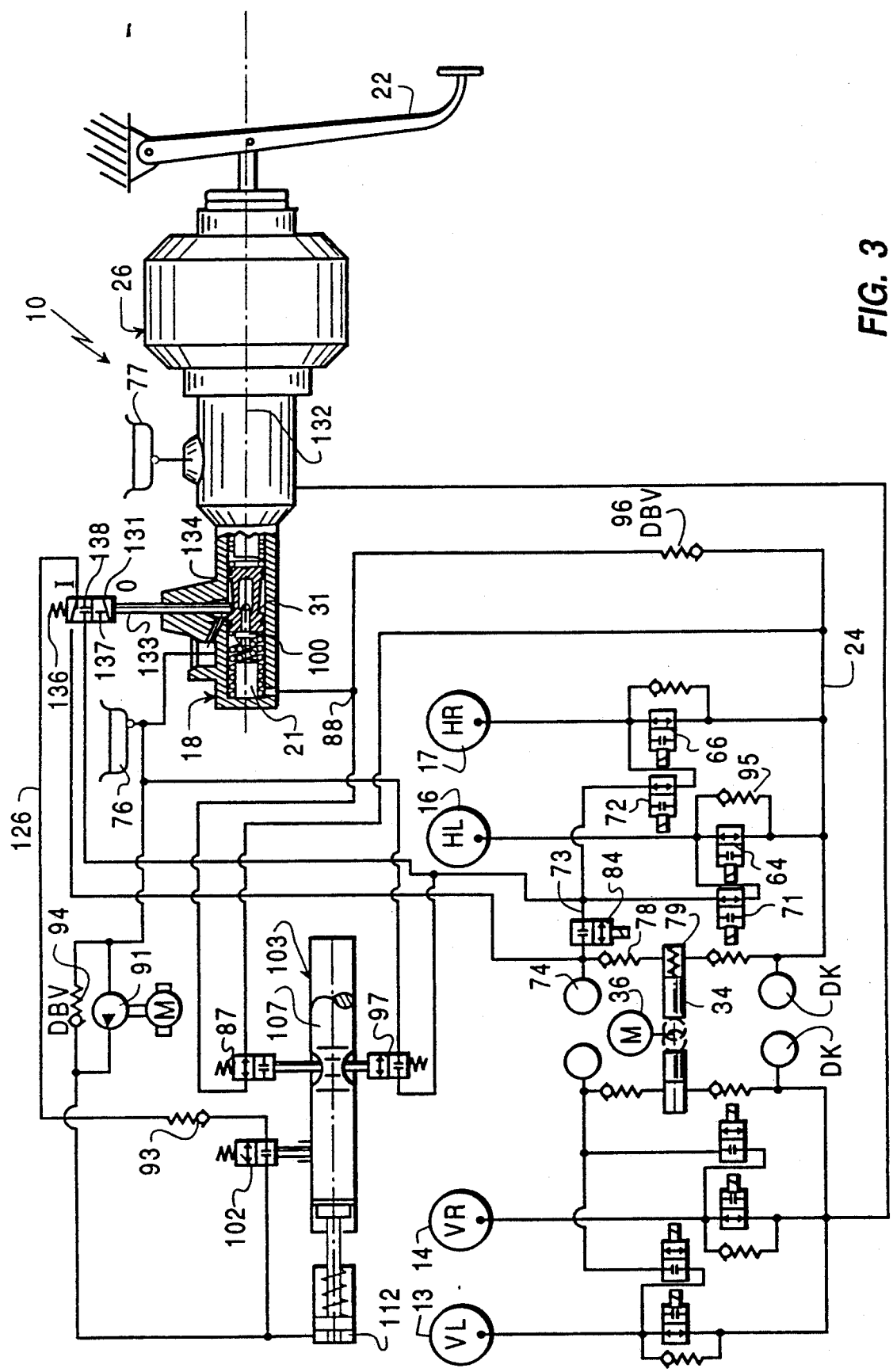
FIG. 3 shows a third embodiment, corresponding in functional terms to the exemplary embodiment according to FIG. 2, in which a supply control valve (in control phases of the ASR) feeds outlet pressure of a precharging pump into the pump chamber of a return pump utilized as an auxiliary-pressure source for the ASR and is designed as a valve which can be changed over mechanically as a result of the actuation of the brake system.

The third embodiment illustrated in FIG. 3, differs from that according to FIG. 2 only in that a first supply control valve 131 system is provided to replace the supply control valve 101 according to FIG. 2. This first supply control valve 131 is a mechanically controlled 3/2-way valve which is changed over from its illustrated basic position O into its alternative functional position I when the driver actuates the brake unit 18. The basic position O of this valve 131 occurs during drive-slip control mode, while the alternative functional position I occurs during normal braking and to braking subjected to an anti-lock control. This first supply control valve 131 is actuable by means of a control tappet 133 which extends radially in relation to the central longitudinal axis 132 of the brake unit 18 and which is slideably supported on a ramp-shaped control surface 134 of the secondary piston 31 of the brake unit 18. The control valve is spring biased against this control surface 134 by valve spring 136. The valve 131 is changed over to its functional position I from its basic position O as a result of the radial outward displacement of the control tappet 133, obtained when the secondary piston 31 of the brake unit 18 undergoes a displacement in the direction of a brake-pressure build-up in the secondary outlet-pressure space 21 of the brake unit.

In this functional position I of the first supply control valve 131 (assigned to the braking mode) corresponds to the basic position O of the first supply control valve 101 of the second embodiment according to FIG. 2. In this functional position I, the outlet non-return valve 93 of the precharging pump 91 is subjected (on its spring side) to the brake pressure effective in the brake circuit II of the driven vehicle wheels via throughflow path 137 of the supply control valve 131. This allows for checking of leaks in the way explained above. Moreover, in this operating state of the brake system, the ASR outlet valve 97 is subjected to brake pressure on its connection side facing away from the brake-fluid reservoir 76, 77 and there can likewise be checked for leaks.

In the basic position O of the first supply control valve 131 (corresponding to the non-actuating state of the brake system 10 and assigned to the drive-slip control mode), as soon as the second supply control valve 102 has assumed its throughflow position I, the precharging pump 91 is connected to the inlet of the return pump 34 of the rear-axle brake circuit II via low-pressure supply line 126 and throughflow path 138 (open in the basic position O of the first supply control valve 131). The inlet is formed at the common connection point of the buffer accumulator 74 and of the inlet non-return valve 78 of the return pump 34 so as to allow the return pump 34 to work as a pressure source for the drive-slip control.

Otherwise, the control of the brake-pressure build-up brake-pressure holding and brake-pressure rebuild-up phases of the drive-slip control of FIG. 3 takes place in the same way as explained with reference to FIG. 1.

In the embodiments of FIGS. 1 to 3, each wheel brake 16 and 17 of the brake circuit II of the driven vehicle wheels has an inlet valve 64, 66 and an outlet valve 71, 72, by means of which a "decoupled" control in phase opposition is possible in the drive-slip control mode. Accordingly when the brake pressure is being increased on one wheel brake 16 or 17, the brake pressure can be lowered on the other wheel brake 17 or 16.

This type of control, although constituting the best possible utilization of propulsion obtainable with a drive-slip control, nevertheless also involves a relatively high technical outlay.

A reduction of this technical outlay is possible if a change is made to a coupled drive-slip control on the driven vehicle wheels, such that whenever the brake pressure is increased or reduced on one of the wheel brakes 16 and/or 17 of the driven vehicle wheels, the brake pressure at the other particular wheel brake 17 or 16 is maintained at the value then obtained.

Accordingly the fourth embodiment (FIG. 4) shows such a constructional simplification. Here the inlet 2/2-way solenoid valves 64 and 66 have a basic throughflow position O of and are utilized as outlet valves so that there is no need for valves corresponding to the outlet valves 71 and 72 of the embodiments according to FIGS. 1 to 3. Isolating 2/2-way solenoid valves 141 and 142 are also provided and in their basic positions O, the two wheel brakes 16 and 17 of the rear-axle brake circuit II are each connected to the inlet connection 143 of the accumulator isolating valve 84. In the energized position I the wheel brake(s) 16 and/or 17 are shut off individually or jointly from this inlet connection 143.

During normal braking (when the ASR control valve 87, the inlet valves 64 and 66, the isolating valves 141 and 142 and the accumulator isolating valve 84 assume their illustrated basic positions), the outlet non-return valve 93 of the precharging pump 91 (which incidentally is the only safety-relevant valve in FIG. 4) is likewise exposed to the brake pressure via the two isolating valves 141 and 142 in their throughflow position O and thus can be checked for leaking.

During drive-slip control: the precharging pump 91 and the return pump 34 of the rear-axle brake circuit II are activated, the accumulator isolating valve 84 is changed over to its throughflow position I, the two isolating valves 141 and 142 are also changed over to their energized shut-off positions I, and initially (that is at least for the duration of the introductory brake-pressure build-up phase of the drive-slip control), the ASR control valve 87 is also switched to its shut-off position. The selection of the wheel brake 16 or 17 on which the drive-slip control first commences takes place because the inlet valve 64 or 66 of the wheel brake 16 or 17 undergoing the control is held in its basic position, while the inlet valve 66 or 64 of the wheel brake 17 or 16 not undergoing the control is moved into its shut-off position I. Brake-pressure holding phases of the drive-slip control are obtained by means of the shut-off position of the respective inlet valve 64 or 66 and with a particular isolating valve 141 or 142 simultaneously being in the shut-off position. To obtain a brake-pressure reduction phase of the drive-slip control, for example on the wheel brake 16 of the left rear wheel, the inlet valve 64 of the left rear-wheel brake and the ASR control valve 87 are switched back into their basic position O, while the isolating valves 141 and 142 of the two rear-wheel brakes 16 and 17 and the inlet valve 66 of the right rear-wheel brake 17 remain held in their shut-off positions I. Now the brake pressure can be reduced towards the secondary outlet-pressure space 21 of the brake unit 18 via valve 64 (now utilized as an outlet valve) and the ASR control valve 87 (likewise used as an outlet valve) and can be reduced towards chamber 76 of the brake-fluid reservoir 77 assigned to the rear-axle brake circuit II via the open central valve 100 of the secondary piston 31 of the brake unit 18. The other wheel brake 17 has its brake pressure maintained.

Whenever the anti-lock control responds, the return pumps 33 and 34 are activated and the accumulator isolating valve 84 of the rear-axle brake circuit II is switched to its throughflow position I. To achieve a brake-pressure reduction phase of the anti-lock control on at least one of the rear-wheel brakes 16 and/or 17, the inlet valves 64 and 66 of the two rear-wheel brakes 16 and 17 are changed over to the shut-off position I and at least one of the isolating valves 141 and 142 to which the brake pressure is to be lowered is changed over to its throughflow position I. Brake fluid flowing off from one or both wheel brakes 16 and 17 via the isolating valves 141 and 142 is pumped back into the secondary outlet-pressure space 21 of the brake unit 18 by means of the return pump 34 of the rear-axle brake circuit II.

In order to maintain the brake pressure in the a particular rear-wheel brake 16 and/or 17 at a value then reached, its inlet valve 64 or 66 and its isolating valve 141 or 142 are jointly moved into their respective shut-off positions I. During a pressure-holding phase on one of the two rear-wheel brakes 16 or 17, brake pressure can again be built up on the other particular rear-wheel brake 17 or 16. Preferably, however, the control is carried out by always controlling in the same way. That is reducing the brake pressure or holding it or building it up again, on both rear-wheel brakes 16 and 17.

Figure 4:
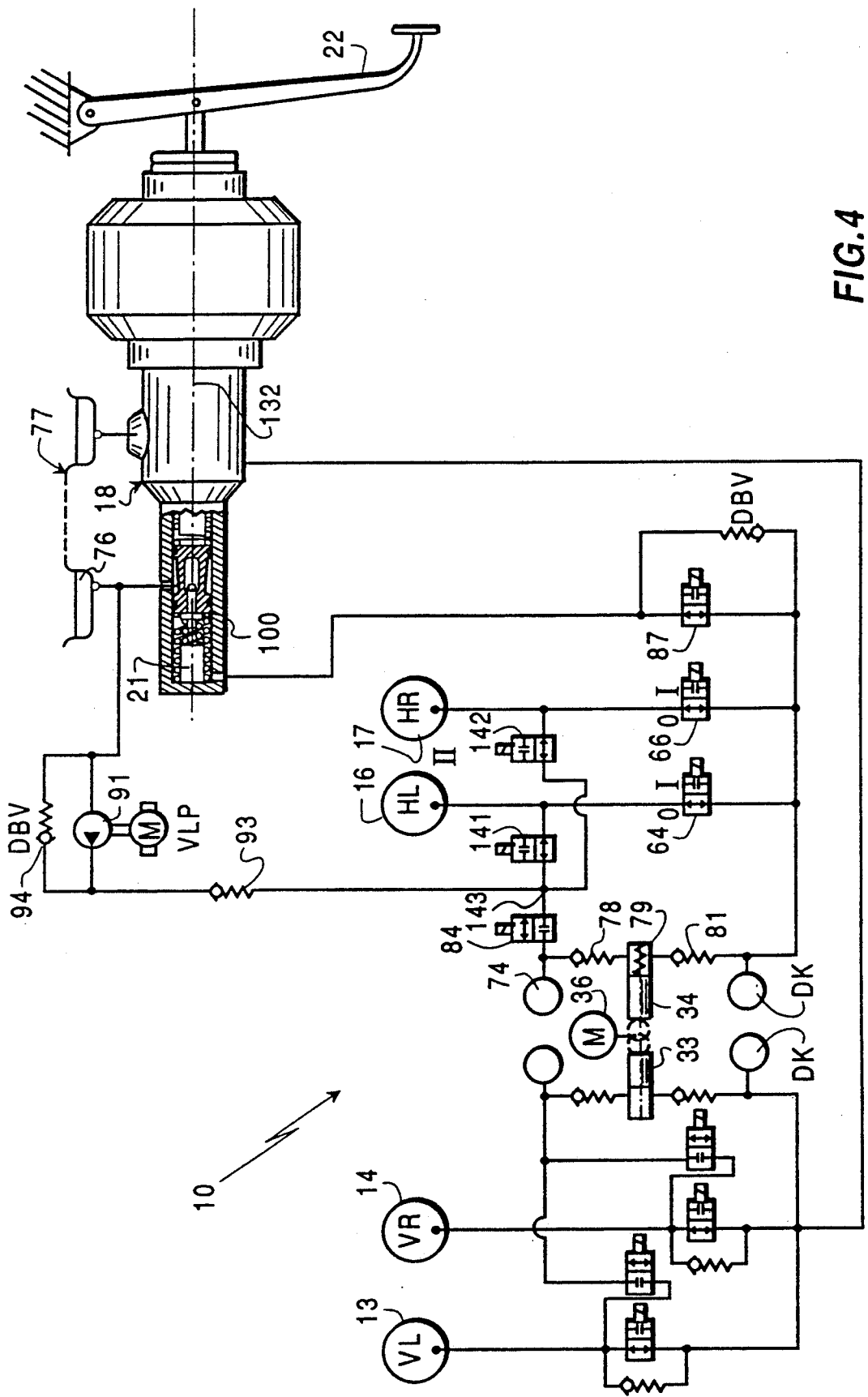
FIG. 4 shows a fourth embodiment with a solenoid valve which is utilized both as an ASR control valve and as an ASR outlet valve and which is connected between the main brake line of the brake circuit of the driven vehicle wheels and the brake unit, and with isolating solenoid valves.
Figure 5:
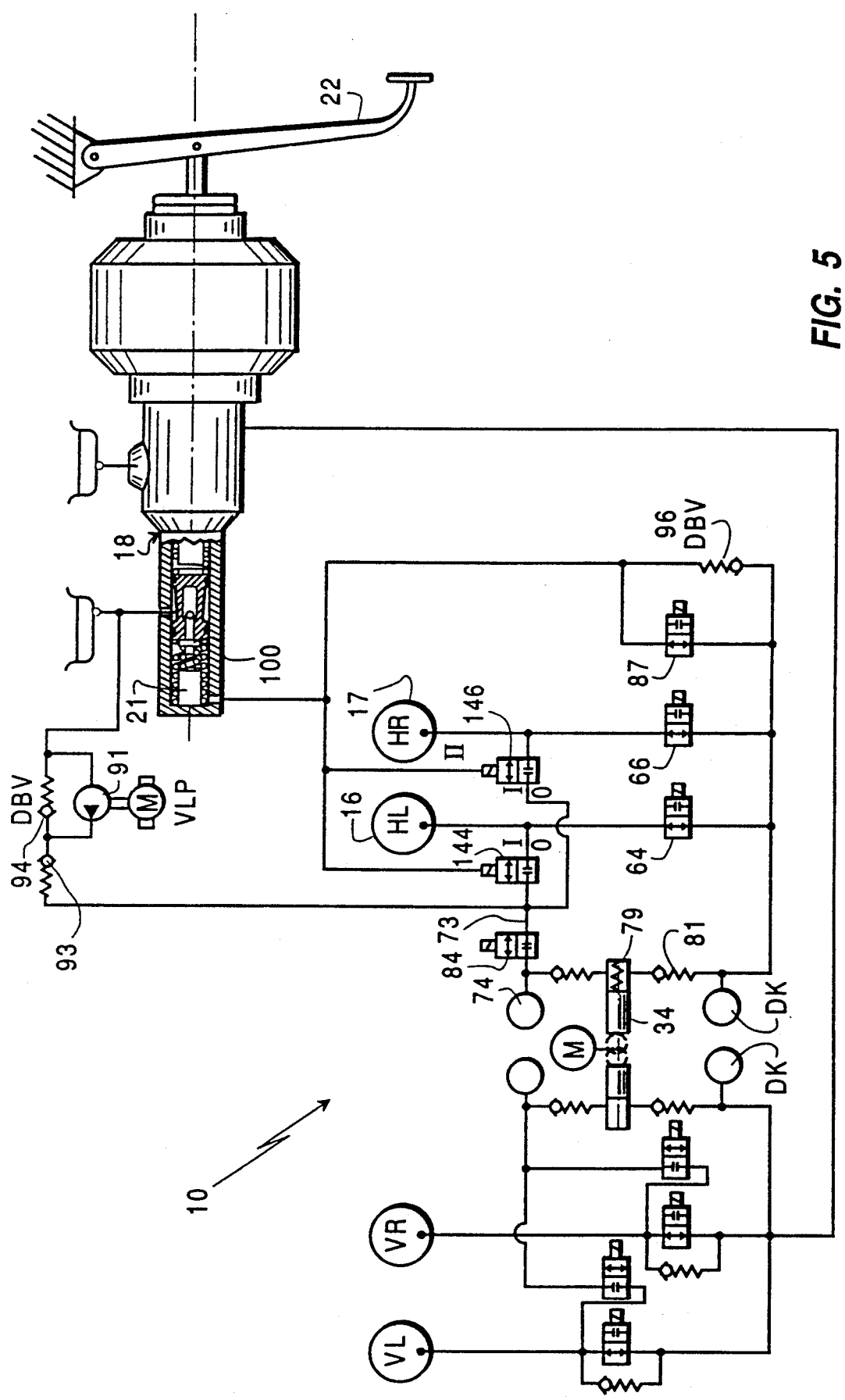
FIG. 5 shows a fifth embodiment, similar to the exemplary embodiment according to FIG. 4, in which the isolating valves are designed as hydraulically activated valves which are controllable by means of brake pressure which can be fed from the brake circuit of the driven vehicle wheels.

The fifth embodiment illustrated in FIG. 5, differs from that according to FIG. 4 essentially in that instead of the solenoid isolating valves 141 and 142 of the exemplary embodiment according to FIG. 4, there are pressure-controlled isolating valves 144 and 146. Their basic shut-off position O is the position suitable for the drive-slip control mode. These two isolating valves are jointly changed over to their throughflow positions I by means of the brake pressure generated in the secondary outlet-pressure space 21 of the brake unit 18.

In brake-pressure reduction phases, the accumulator isolating valve 84 is moved into its open position and the inlet valves 64 and 66 are moved into their shut-off positions. To obtain brake-pressure holding phases of the anti-lock control, the accumulator isolating valve 84 is switched back into its basic shut-off position.

The advantage of the exemplary embodiment according to FIG. 5 (in relation to that of FIG. 4) is that two solenoid valves are replaced by hydraulically activatable valves 144 and 146 which, in terms of construction, are substantially simpler and therefore cheaper to produce.

In a sixth embodiment (FIG. 6), there are two 2/2-way isolating valves 147 and 148 which correspond in functional terms to the jointly actuable isolating valves 144 and 146 according to FIG. 5. That is, they assume their throughflow position during normal braking and during braking subjected to an anti-lock control and their shut-off position in the drive-slip control mode. These two isolating valves 147 and 148 are actuated by means of a control slide 103 which, in terms of construction and the manner of activation, is similar to the correspondingly designated control slide according to FIG. 2. The slide 103 actuates the two isolating valves 147 and 148 in the same way as the control slide 103 (provided according to FIG. 2) actuates its ASR control valve 87 and ASR outlet valve 97. The control slide 103 actuates the supply control valve 102, which is of the same construction as and similar in functional terms to, the supply control valves 101 and 102 designated in FIGS. 2 and 3.

A seventh embodiment (FIG. 7), differs from that according to FIG. 5 only in that the two jointly actuable isolating valves 144 and 146 are designed as mechanically controlled valves which can be actuated by means of control tappets 149 and 151 extending radially relative to the longitudinal axis 132 of the brake unit 18. As a result of the effect of the valve springs urging the isolating valves 144 and 146 into their basic positions, these control tappets 149 and 151 are slideably held against ramp-shaped control surfaces 134 and 152 of the secondary piston 31 of the brake unit 18. In the event of a displacement of the secondary piston 31 in the direction of a brake-pressure build-up in the secondary outlet-pressure space 21 of the brake unit 18, the two isolating valves 144 and 146 are changed over to their throughflow positions I from their basic shut-off positions O.

In the embodiments of FIGS. 3 to 7, the only functional element considered to be safety-relevant is the outlet non-return valves 93 of the precharging pump 91, the leaking of which can be checked by means of a normal braking operation.

An eighth embodiment (FIG. 8), corresponds in terms of the activation of the inlet valves 64 and 66 and of the brake isolating valves 141 and 142 and also of the accumulator isolating valve 84, to the fourth embodiment of FIG. 4. It differs in functional terms in that in the event of a pressure reduction in the drive-slip control, brake fluid is diverted directly to chamber 76 of the brake-fluid reservoir 77. A flow-off line 153 is provided for this purpose and can be opened and shut off by means of the ASR outlet valve 97. The basic position O of this outlet valve 97 is its shut-off position. In brake-pressure reduction phases of the drive-slip control, the ASR outlet valve 97 is moved into its throughflow position I by an output signal of the electronic control unit 50 which is generated in a sequence appropriate for the particular control.

Figure 8:
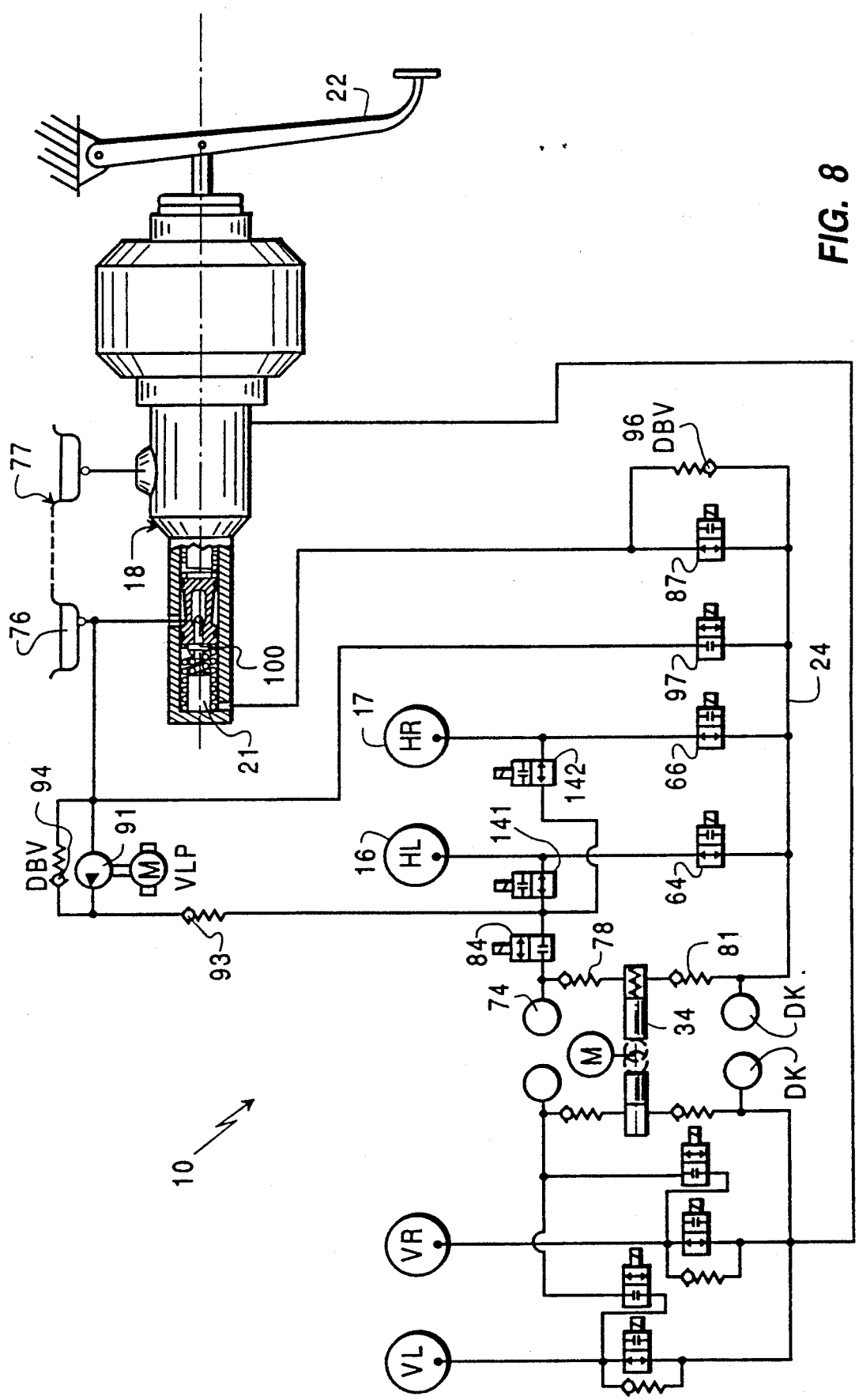
FIG. 8 shows an eighth embodiment corresponding in functional terms to the embodiment according to FIG. 4, with an additional ASR outlet solenoid valve.

A ninth embodiment (FIG. 9), is similar in functional terms to the eighth embodiment of FIG. 8, but differs from this in that the isolating valves 144 and 146 are designed as pressure-controlled valves which operate in the manner of the fifth embodiment of FIG. 5. They are activated by means of the brake pressure generated in the secondary outlet-pressure space 21 of the brake unit 18. In further contrast to the eighth embodiment of FIG. 8, instead of the electrically activatable ASR control valve 87, there is an ASR control valve 87 which is controlled in dependence on pressure (displacement of a slide 103) and which is actuated by the outlet pressure of the precharging pump 91 as explained in FIGS. 2 and 3. The supply control valve 102 also corresponds in constructional and functional terms to the corresponding designated valve 102 of FIG. 2.

Figure 6:
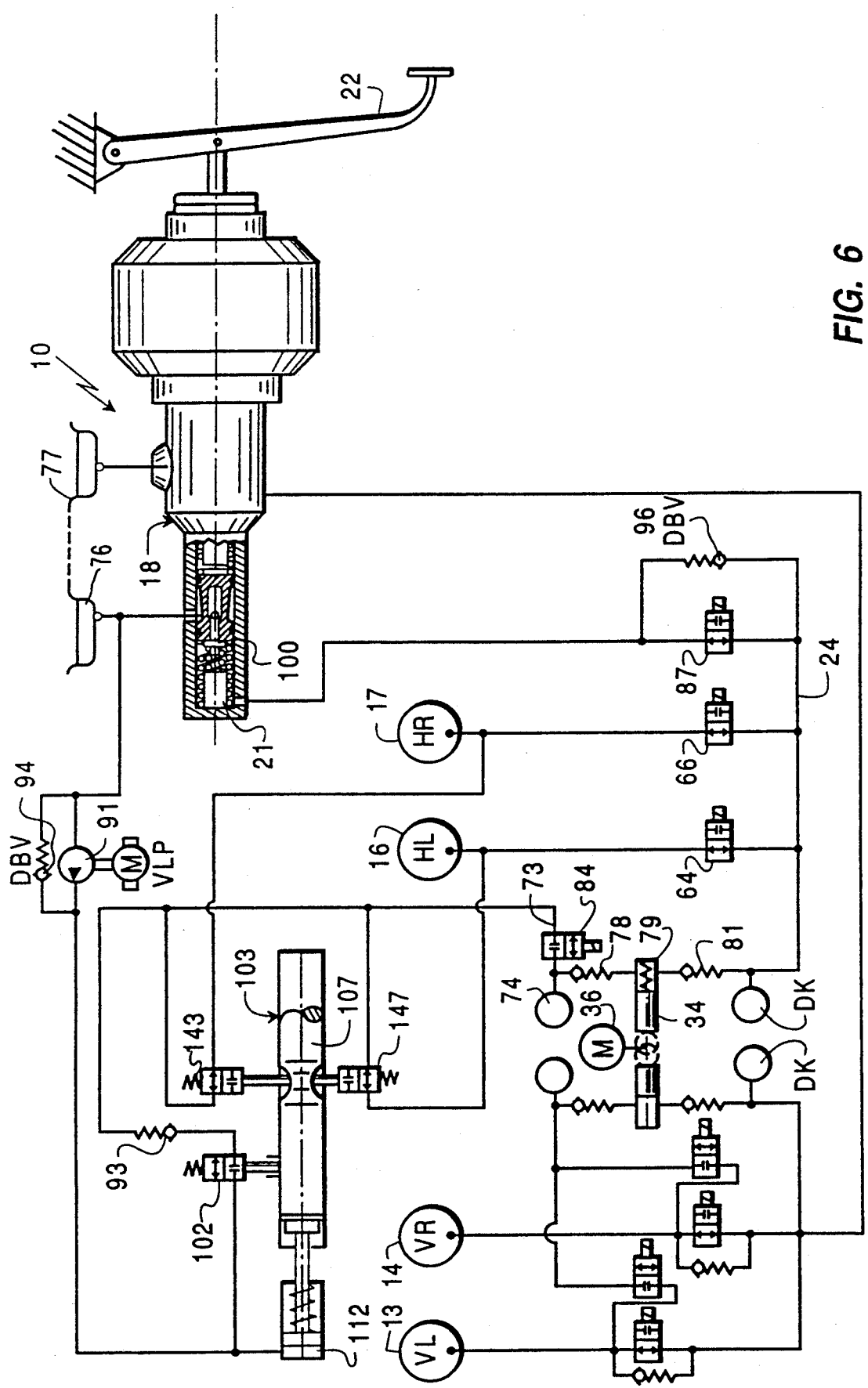
FIG. 6 shows a sixth embodiment in which the isolating valves are actuatable by means of a control slide similar to the control slide according to FIG. 2.
Figure 9:
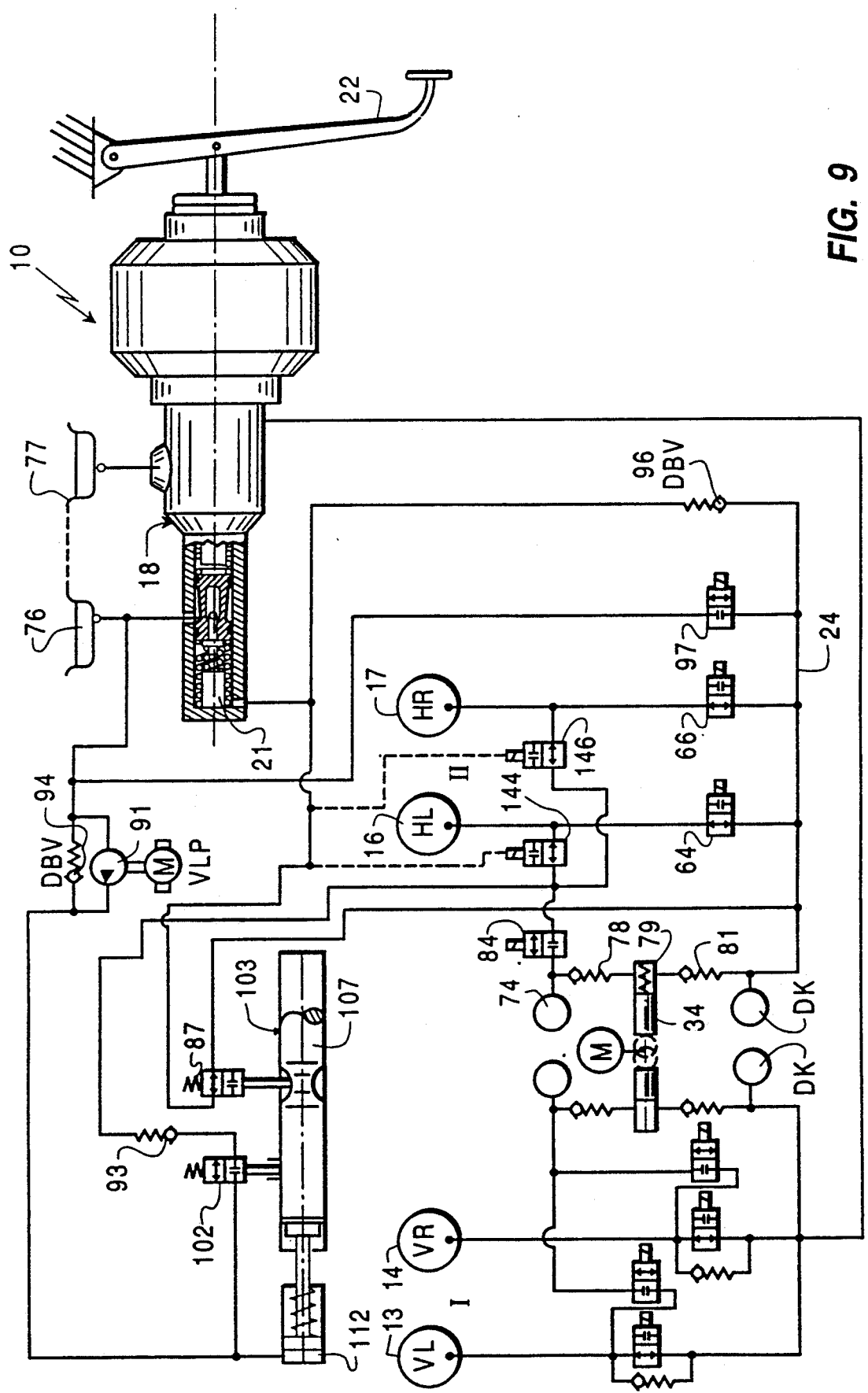
FIG. 9 shows a ninth embodiment with an ASR control similar to the eighth embodiment according to FIG. 8 and with isolating valves controlled by brake pressure and with an ASR control valve activated hydromechanically by means of the outlet pressure of the precharging pump.

A tenth embodiment (FIG. 10), differs from that illustrated in FIG. 9 only in that instead of pressure-controlled isolating valves 144 and 146, there are now isolating valves 147 and 148 which are actuable by means of the control slide 103 and which correspond in constructional and functional terms to the isolating valves 147 and 148 of the sixth embodiment according to FIG. 6.

Figure 7:
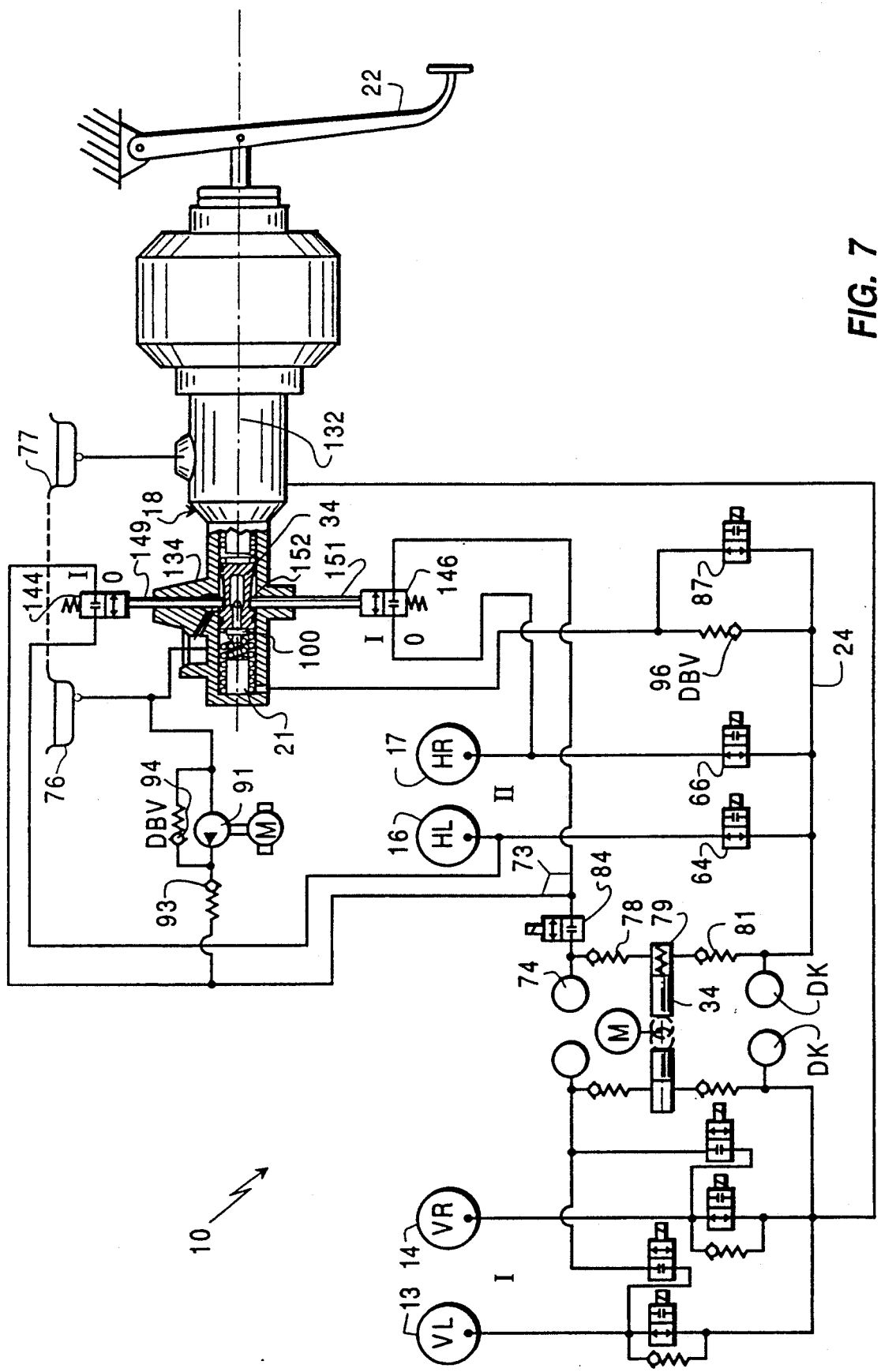
FIG. 7 shows a seventh embodiment in which isolating valves, similar in functional terms to the isolating valves of the sixth embodiment of FIG. 6, can be changed over as a result of the actuation of the brake unit.

An eleventh embodiment (FIG. 11) differs from that according to FIG. 10 in that (as explained with reference to the exemplary embodiment according to FIG. 7) the isolating valves 144 and 146 are changed over as a result of the displacement of the secondary piston 31 of the brake unit 18 and are therefore entirely similar in functional terms to the pressure-controlled isolating valves 144 and 146 of the ninth embodiment according to FIG. 9.

In a twelfth embodiment (FIG. 12), the ASR control valve 87 corresponds in functional terms to the ASR control valves 87 of the above-explained embodiments. A pressure-limiting valve 96, is provided in parallel to the ASR control valve under 87 to provide a limitation of the outlet pressure of the return pump 34 of the rear-axle brake circuit II (utilized in the drive-slip control mode) ASR control valve 87 and pressure linking valve 96 are connected between the brake-fluid reservoir 76, 77 and the compensating connection 156 of the brake unit 18. Otherwise, the exemplary embodiment according to FIG. 12 corresponds in constructional and functional terms to the embodiment according to FIG. 8.

Figure 11:
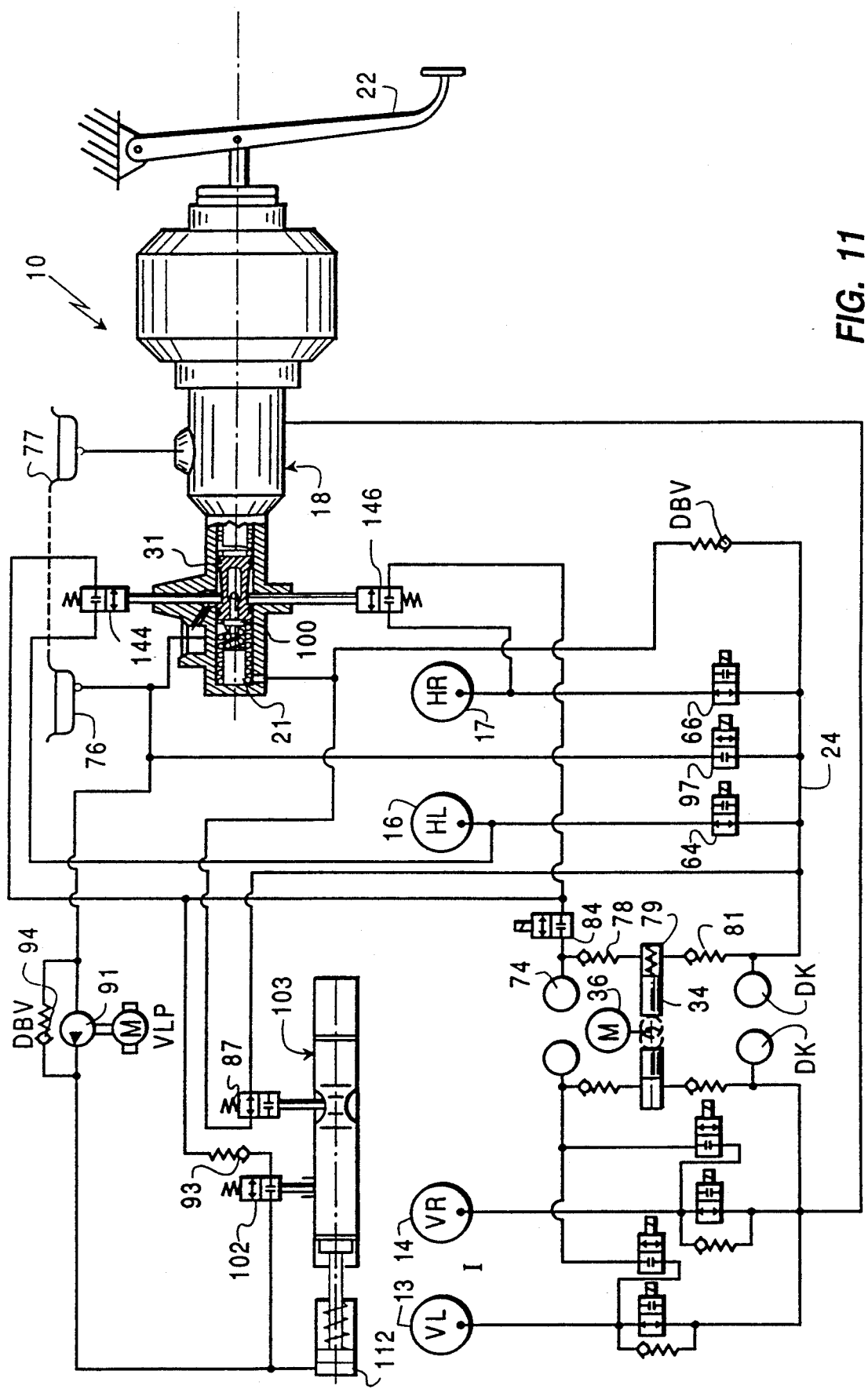
FIG. 11 shows an eleventh embodiment similar in functional terms to the ninth embodiment according to FIG. 9 and with isolating valves which can be changed over as a result of the actuation of the brake unit of the brake system.
Figure 12:
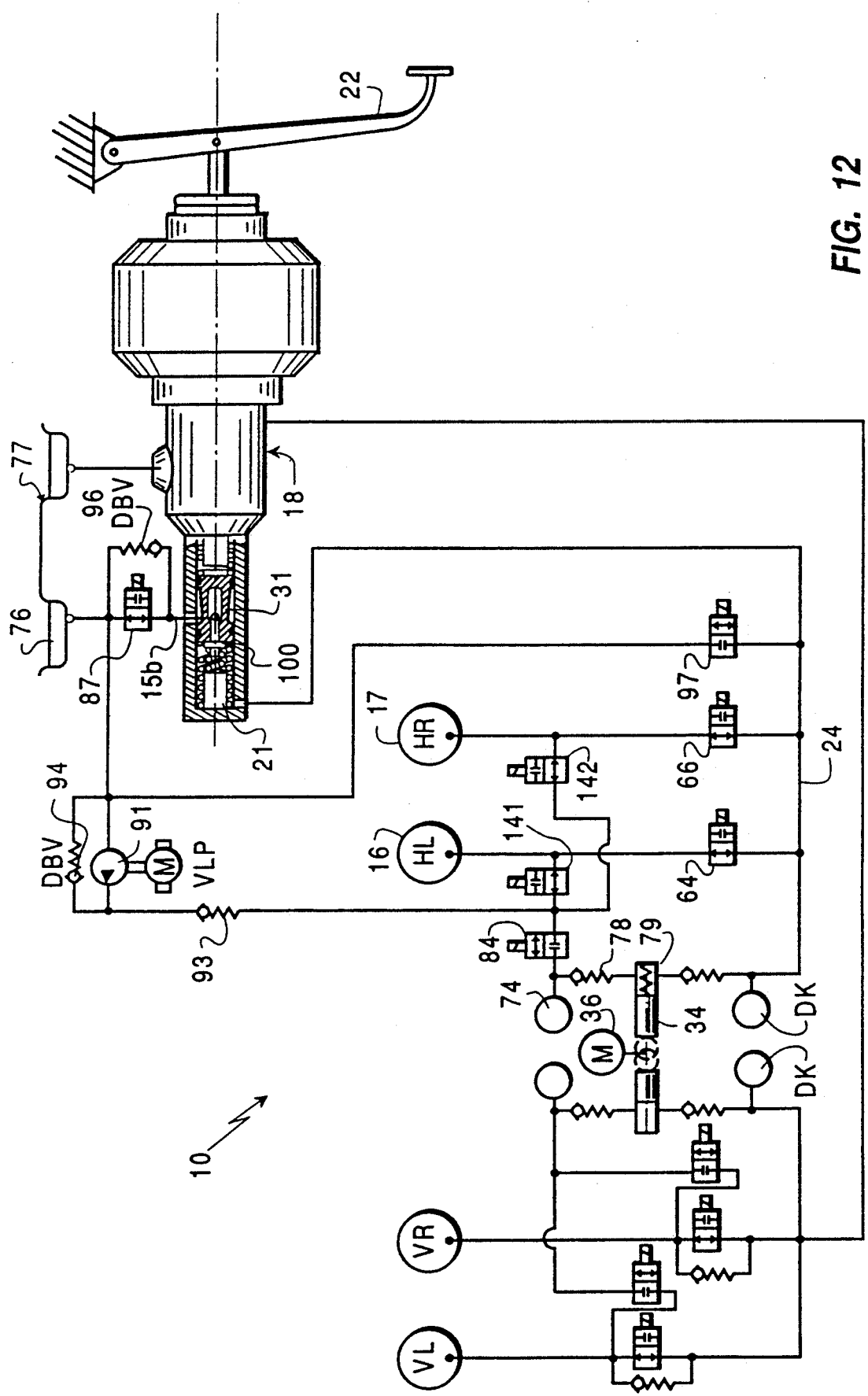
FIG. 12 shows a twelfth embodiment, corresponding in functional terms to that according to FIG. 8, but in which the ASR control valve is connected between the brake unit and the brake-fluid reservoir of the brake system.

In contrast to the twelfth embodiment of FIG. 12 (in which ASR control valve 87 is designed as a solenoid valve) the thirteenth embodiment (FIG. 13) has a corresponding functional ASR control valve 87 that is actuated by means of a control slide 103 in the manner referenced in FIGS. 2 and 11. In further contrast to the twelfth embodiment of FIG. 12 (in which the brake isolating valves 141 and 142 are designed as 2/2-way solenoid valves) in FIG. 13 there are hydraulically controlled 2/2-way isolating valves 144 and 146 with a switching and activation arrangement by the outlet pressure of the brake unit 18 in a manner similar to FIG. 9.

Figure 13:
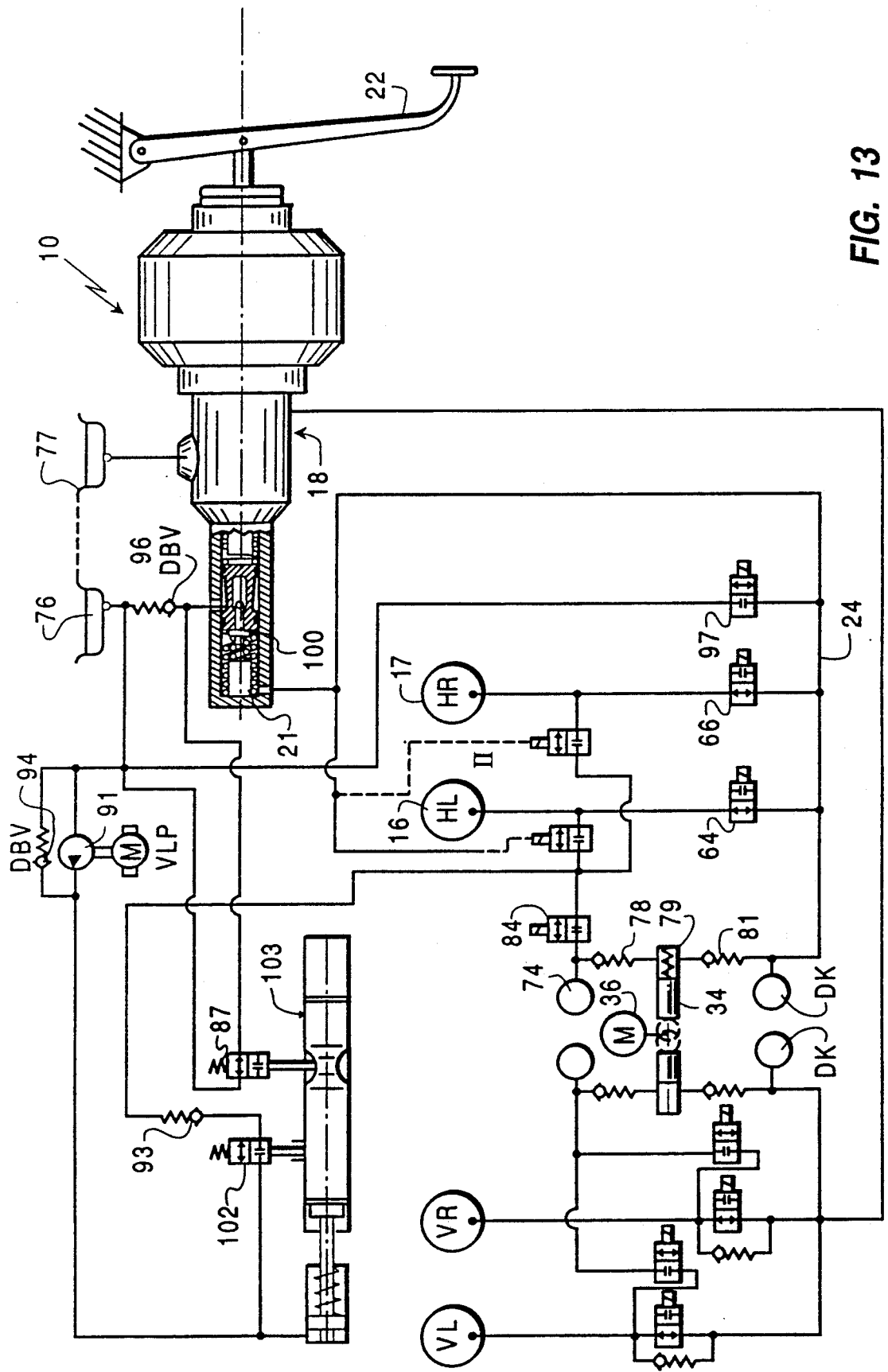
FIG. 13 shows a thirteen embodiment, corresponding in functional terms to that according to FIG. 12, but in which the isolating valves are controlled by brake pressure and the ASR control valve is controllable indirectly by means of the outlet pressure of a precharging pump of the return pump of the brake circuit of the driven vehicle wheels.

The fourteen embodiment (FIG. 14) differs from that illustrated in FIG. 13 in that, instead of the pressure-controlled isolating valves 144 and 146, there are mechanically displaced-controlled isolating valves 147 and 148. In the event of an activation of the precharging pump 91 (drive-slip control) the isolating valves 144 and 146 are changed over to their shut-off position by means of the control slide 103 and remain held in this shut-off position for the duration of the drive-slip control.

Figure 14:
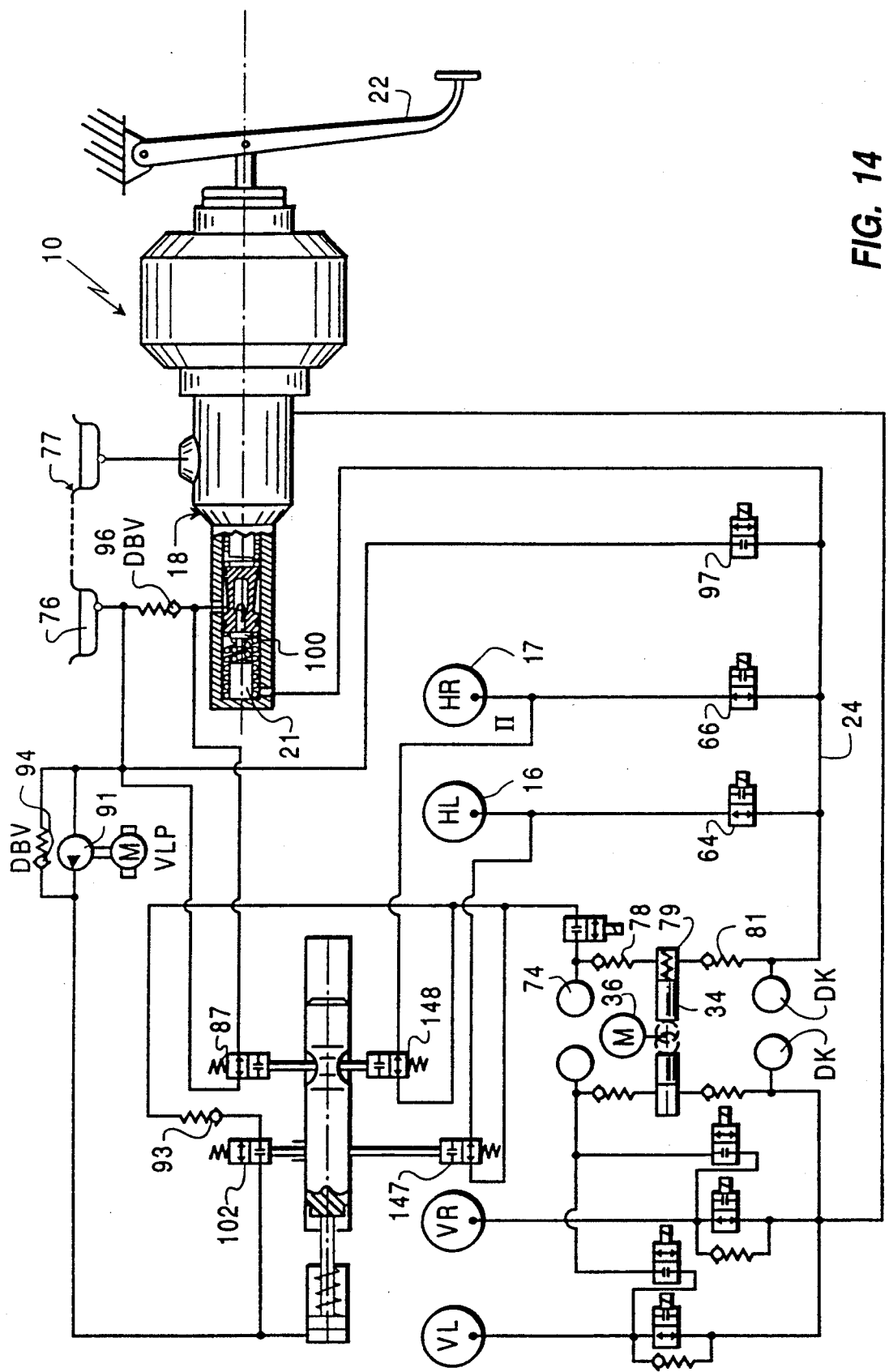
FIG. 14 shows a fourteenth embodiment, corresponding in functional terms to that of FIG. 13, but with isolating valves that can be changed over by means of a hydromechanical control slide.

In the fifteenth embodiment (FIG. 15) 2/2-way isolating valves 144 and 146, similar to the isolating valves 147 and 148 according to FIG. 14, have their basic shut-off position switchable as a result of the activation of the brake unit 18 in the manner explained in FIG. 11.

The sixteenth embodiment (FIG. 16) differs in principle from that illustrated in FIG. 12 in that the ASR control valve 87 is also utilized as an ASR outlet valve. As a result, in comparison with the embodiment of FIG. 12, no solenoid valve 97 is needed. However, it is necessary to design the central valve 100 of the secondary piston 31 of the brake unit 18 in such a way that a sufficient pressure compensation between the wheel brakes 16 and 17 and the brake-fluid reservoir 76, 77 can take place via this central valve 100 even in extreme cases, for example at low temperatures when the brake fluid has increased viscosity.

In the seventeenth embodiment (FIG. 17) in contrast to that according to FIG. 16, once again there is a pressure-dependent activation of the brake isolating valves 144 and 146, in a similar way to the exemplary embodiments according to FIGS. 5, 9 and 13.

Figure 10:
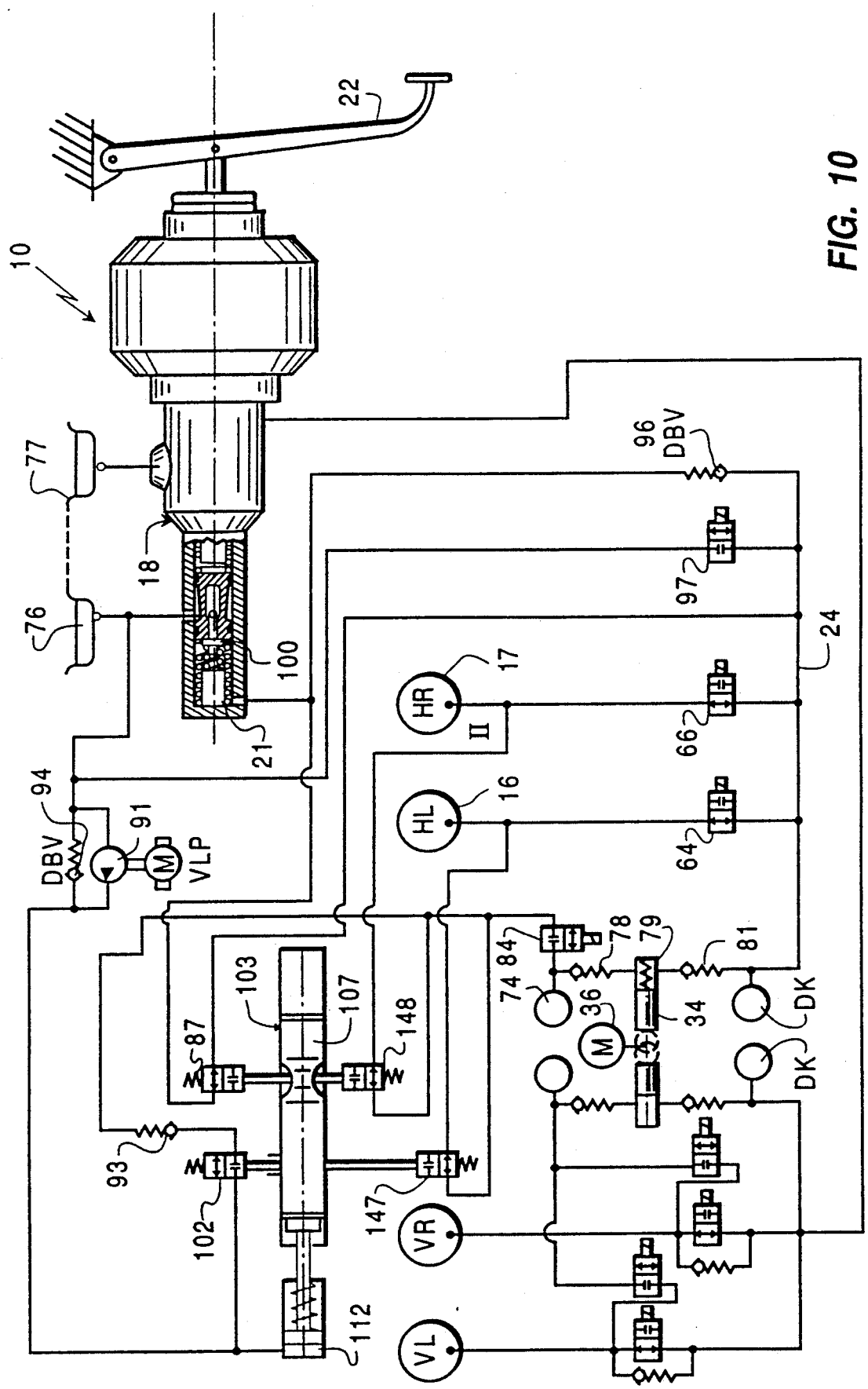
FIG. 10 shows a tenth embodiment similar in functional terms to that according to FIG. 9 and with isolating valves actuatable by means of a hydromechanical control slide.
Figure 16:
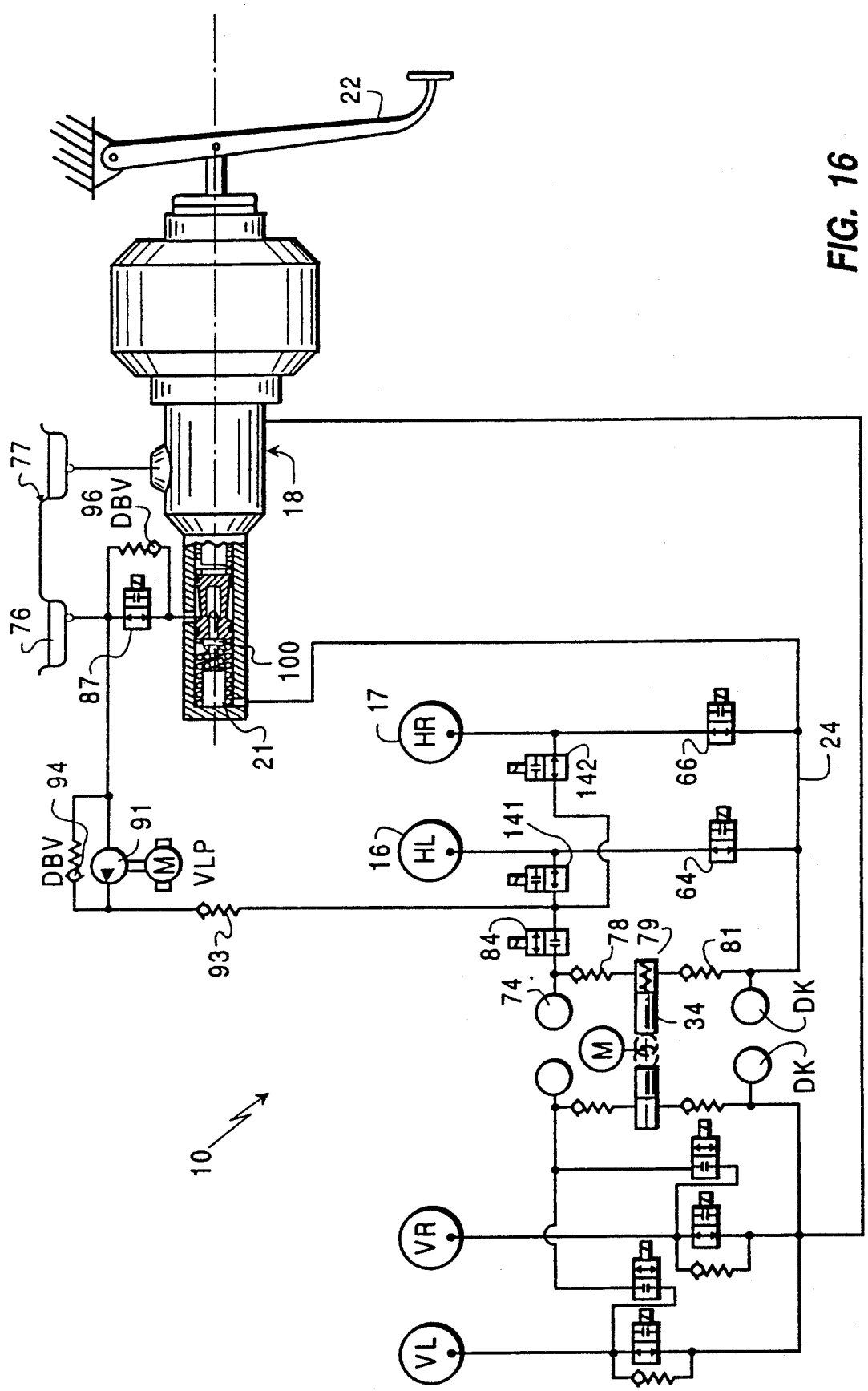
FIG. 16 shows a sixteenth embodiment, similar in functional terms to that of FIG. 12 and in which the ASR control valve is also utilized as an outlet control valve.
Figure 17:
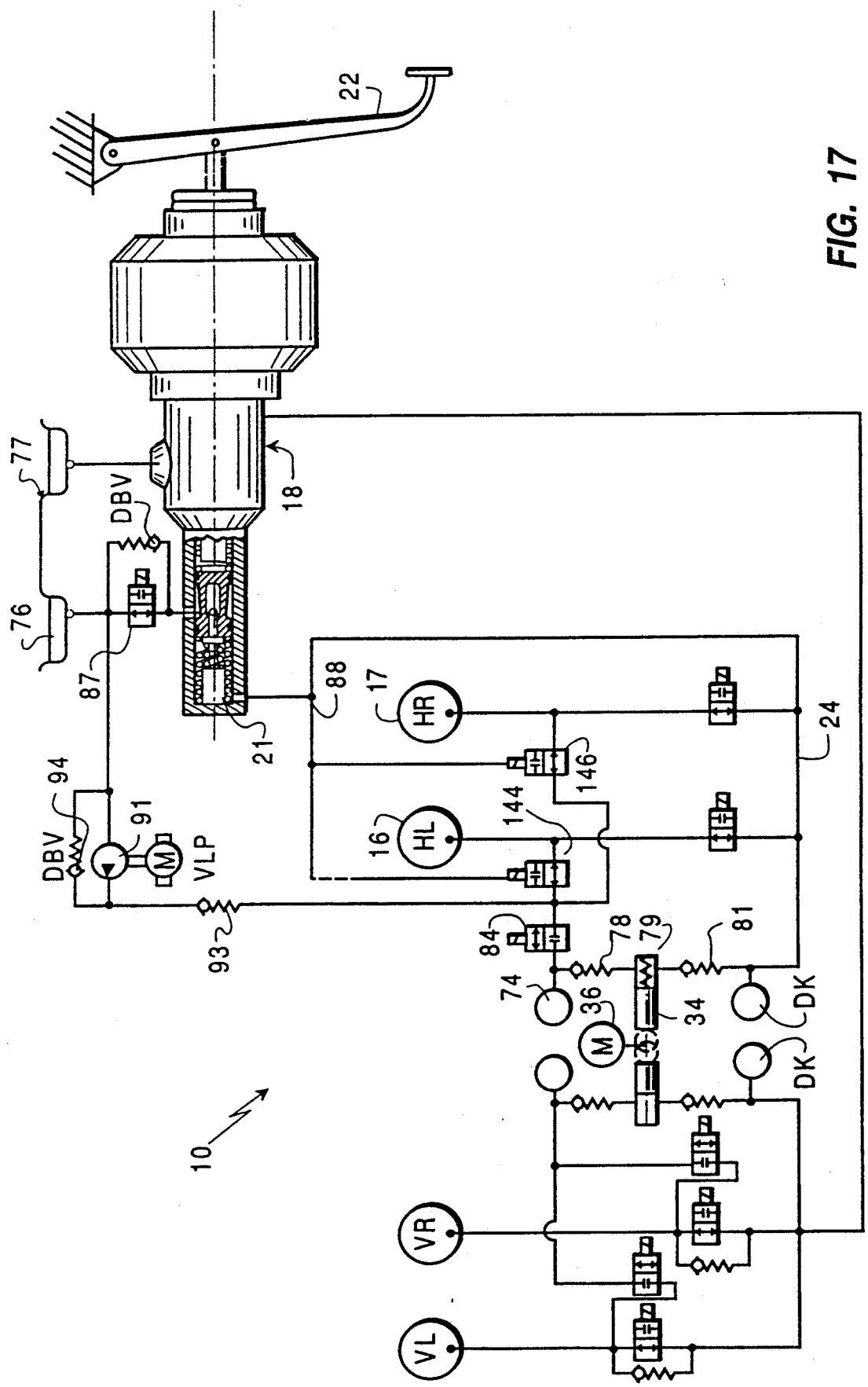
FIGS. 17, 18 and 19 show three additional embodiments of the ASR according to the invention which work by the brake-pressure-dependent activation of the isolating valves; by the hydromechanical actuation of the isolating valves; and by the isolating valves controllable as a result of the actuation of the brake system respectively.

The eighteenth embodiment (FIG. 18) differs from that according to FIGS. 16 and 17 in that, the brake isolating valves 147 and 148 are designed as valves actuable mechanically by means of a control slide 103, the actuation taking place in a similar way to that provided in FIGS. 6, 10 and 14.

Figure 15:
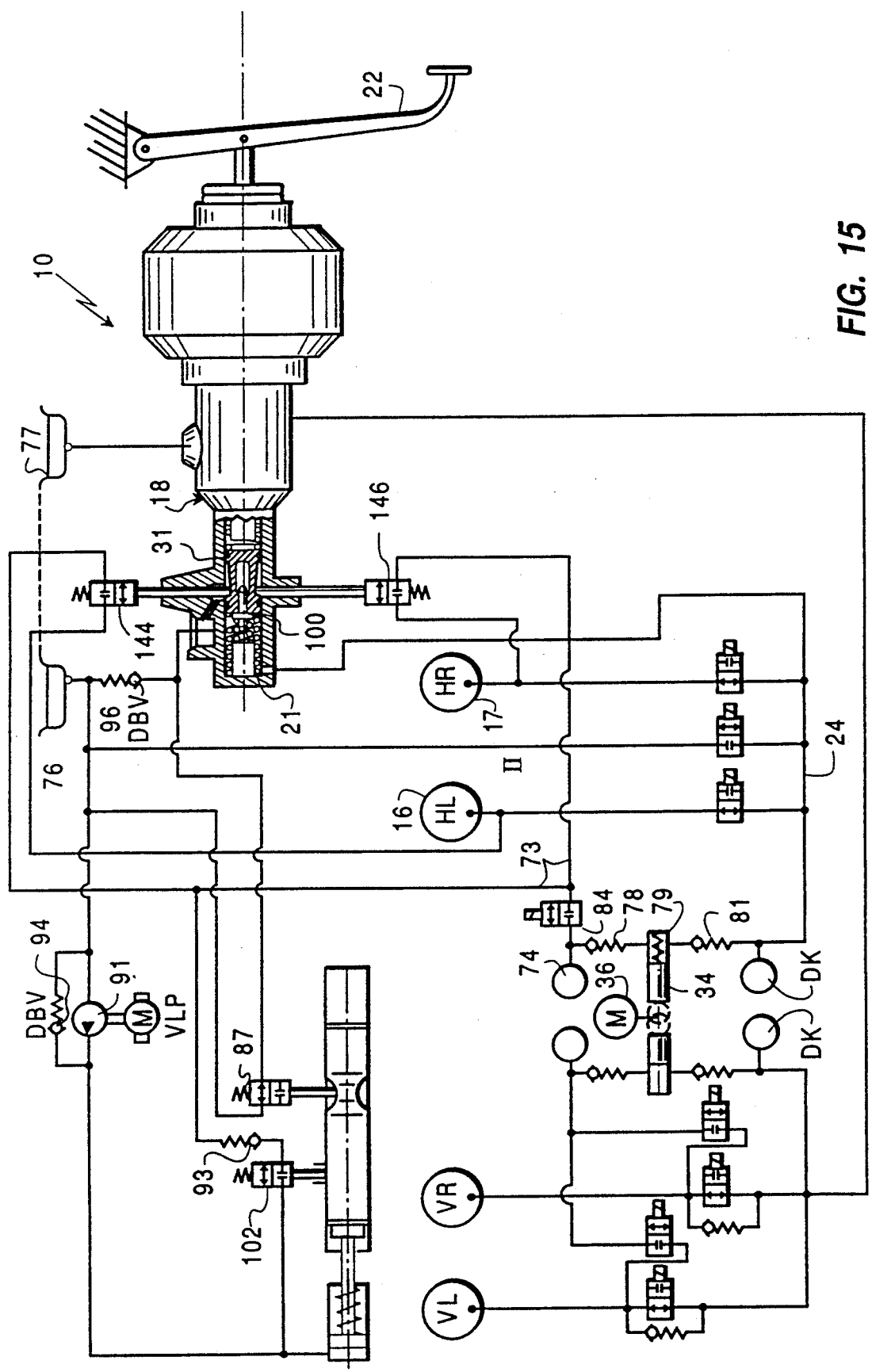
FIG. 15 shows a fifteenth embodiment similar in functional terms to that of FIG. 14 and in which the isolating valves can be changed over as a result of the actuation of the brake unit.
Figure 18:
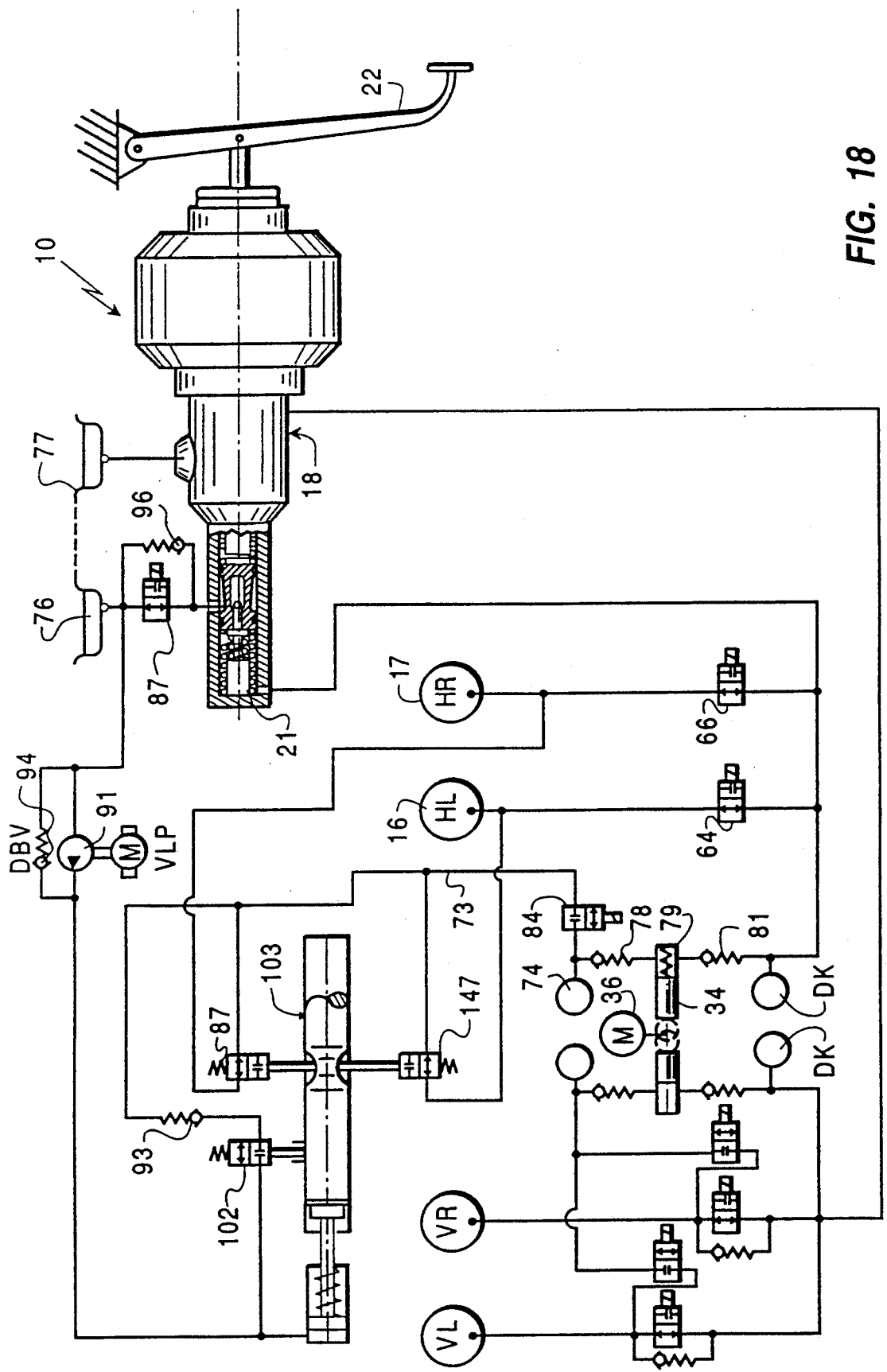
Figure 19:
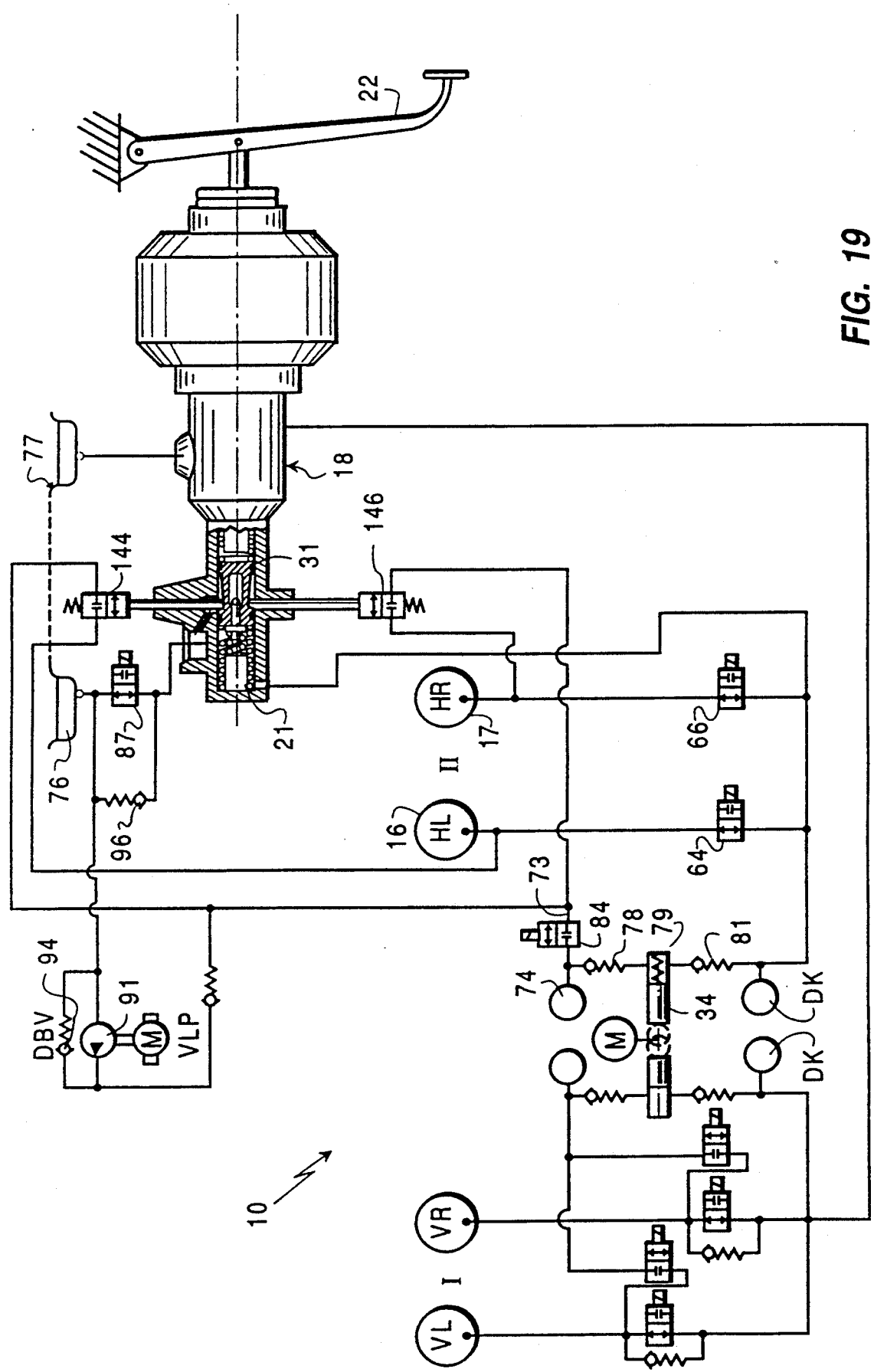

The nineteenth embodiment (FIG. 19) differs from that according to FIG. 18 in that the isolating valves 144 and 146 are controlled as a result of the actuation of the brake unit 18 (displacement of the secondary piston 31 of the brake unit) as already explained by reference to the valve actuation according to FIG. 15. Whereas in the exemplary embodiments according to FIGS. 8 to 15, both the non-return valve 93, acting as an outlet non-return valve of the precharging pump 91, and the ASR outlet valve 97 can lead to the failure of the respective rear-axle brake circuit II in the event of a malfunction, in the exemplary embodiments according to FIG. 16 to 19 this danger is diminished, since ASR outlet valves are not required here.

Instead of the precharging pump 91 with its own electrical drive, there can be a further piston pump (not shown) which is driven by the eccentric drive 36 of the two return pumps 33 and 34 and which has a piston constantly held against the circumferential surface of the driving eccentric by means of a spring. The inlet valve of such a pump can be so designed that when the pump piston executes its suction stroke (leading away from the inlet port of the pump chamber), that during the last phase of this suction stroke and in the initial phase of the subsequent delivery stroke, the inlet valve is open. Because of the sealing of its valve body against a valve seat surrounding the inlet port, it shuts off a pressureless brake fluid line leading from the brake-fluid reservoir 76, 77 to the precharging pump 91. An inlet valve of this type can be obtained by connecting its valve body to the pump piston via a short helical spring, of which the length, (in the relax state of this spring) is calculated so that the valve body is lifted off from the valve seat beyond a minimum distance of the piston from the inlet port of the pump chamber and corresponding to a predominant part of the piston stroke. In this manner the brake fluid can flow unimpeded into the pump chamber and after a short initial portion of the pressure build-up stroke of the piston, the inlet valve assumes its shut-off position again.

There is no need for a precharging pump if the return pump 34 of the rear-axle brake circuit II is designed as a so-called self-priming pump (for example, as indicated in FIG. 1) with a pump spring 45 which constantly keeps the pump piston 35 slideably bearing against the eccentric drive surface.

Figure 20:
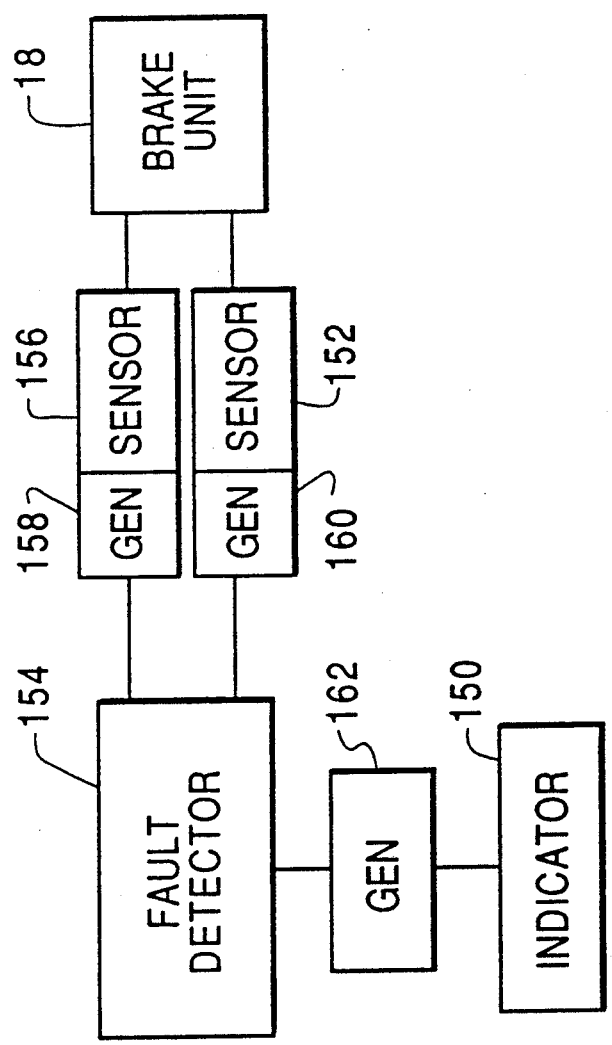
FIG. 20 shows a schematic of a fault detection circuit usable with any of the embodiments.

In order to ensure, without the subjective cooperation of the driver, the detection of a leak of the outlet valve 97 and/or, if present, of the outlet non-return valve 93 of the precharging pump 91, there can be an automatically working indicator device 150 (FIG. 20) which detects an incongruity between the pedal-actuating force and pedal travel and which generates a malfunction signal indication from this. A device of this type can be obtained by providing an electronic or electromechanical sensor 156 which generates an electrical output signal characteristic of the brake pressure in the brake circuit II of the driven vehicle wheels, and a likewise electronic or electromagnetic displacement or position transmitter 152 monitoring the position of that brake-unit piston 31 in the outlet-pressure space 21 assigned to the rear-axle brake circuit II. The output signals of these sensors characteristic of the pressure and the piston position are subjected to a comparison by a fault detector evaluation unit 154 with values of the corresponding parameters characteristic of the proper functioning of the brake system 10. In the event of a malfunction of a brake system, an acoustic or optical indicator signal 150 characteristic of this malfunction is generated by a signal generator 162 as a result of this comparison.

Electrical output signals suitable for a malfunction detection of this kind can also be generated by means of two displacement or position transmitters which each individually detect the positions of the primary and secondary piston of a brake unit 18. A malfunction would be detectable in a fault detection electronic evaluation unit from the fact that the pairs of values of the piston positions obtainable from the output signals of such sensors do not correspond to the pairs of values characteristic of various brake forces or brake pressures which would be stored for comparison purposes.

It may also be mentioned that a safety valve corresponding in functional terms to the bypass valve 129 of the embodiment according to FIG. 2 is expedient for all those embodiments in which the ASR control valve 87 is actuable by means of the hydromechanical control slide 103 (activated by the outlet pressure of the precharging pump 91). In addition to the embodiment according to FIG. 2, are those according to FIGS. 3, 9 to 11 and 3 to 15.

Instead of valve which are controlled by the outlet pressure of the precharging pump 91 indirectly, (that is by the control slide 103) and which must be switchable in a specific sequence, it is also possible to use valves which are activated directly by the outlet pressure of the precharging pump 91. Here the sequence of their switching would be achieved by different amounts of prestress and/or spring constants of valve springs which urge these valves into their basic positions counter to the restoring force of the control pressure.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A braking control system for a vehicle equipped with driven and driveable wheels and brake therefor which is provided with a drive-slip control device, ASR, with an anti-lock control system, ABS, and with a hydraulic dual-circuit brake system comprising:
   one brake circuit operatively associated with the driven vehicle wheels;
   another brake circuit operatively associated with non-driven vehicle wheels;
   the two brake circuits operatively associated with non-driven vehicle wheels;
   the two brake circuits constituting static brake circuits;
   a brake unit provided for brake actuation of all the brakes and having an outlet-pressure space for each brake circuit and a reservoir; and
   and auxiliary pressure source and a buffer accumulator;
   wherein at least on the brake circuit of the driven vehicle wheels, the ABS acts curing pressure reduction phases of anti-lock control such that a quantity of brake fluid corresponding to that quantity of brake fluid flow off from at least one of the wheel brakes subjected to the control, is pumped back into the reservoir of the brake unit through a return line connected between the driven wheel brakes and the reservoir by a return pump which has an inlet side connected to the buffer accumulator and an outlet side connected to the brake unit;
   the ASR acts as a decelerating vehicle wheel tending to spin by subjecting its wheel brake to pressure from the auxiliary-pressure source to maintain its drive slip within a value range compatible with sufficient dynamic stability of the vehicle;
   during ASR, the return pump of the ABS, is connected to the return line of the brake circuit of the driven vehicle wheels to withdraw brake fluid from a reservoir of the brake unit and pump the withdrawn fluid, during pressure build-up phases, to the wheel brake of the vehicle wheel to be decelerated by the ASR;
   an ASR control valve has a basic position in which brake fluid can be positively displaced from the brake unit through a main brake line into the wheel-brake cylinders of the brakes of the driven vehicle wheel as a result of the actuation of the brake unit during normal braking mode and an alternative functional position in which a flow-off of brake fluid from the main brake line of the brake circuit (II) of the driven vehicle wheels to that outlet-pressure space assigned to driven wheels is prevented;
   an accumulator isolating valve is provided to shut off the return line of the brake circuit of the driven vehicle wheels from the brake unit to the buffer accumulator and inlet of the return pump during normal braking;
   said accumulation isolating valve opens the return line between driven wheel brakes and the buffer accumulator during ABS control;
   an outlet non-return valve is connected between the return line and the brake-fluid reservoirs and is held in a shutoff position by a high pressure in the return line;
   at least one isolating valve is connected in the return line between the inlet of the return pump and the outlet non-return valve to provide the high pressure in the return line; and
   the at least one isolating valve shuts off the inlet of the return pump from the at least one driven wheel brake during a pressure build-up phase of the ASR.

2. A braking system according to claim 1, wherein the ASR control valve is a mechanically controlled valve which, at the onset of ASR, is changed over to a shut-off functional position and which otherwise assumes a basic throughflow position for braking.

3. A braking system according to claim 2, wherein the ASR control valve is changed over to its shut-off position by a hydromechanical control slide having an actuating piston which is displaceable in a piston housing and which control slide is urged by a restoring spring into its basic throughflow position;
   the ASR control valve in its basic throughflow position provides a connection between the outlet pressure space of the brake circuit of the driven vehicle wheels to the main brake line;
   the actuating piston is equipped with a piston flange located within the piston housing;
   said piston flange forms a one-sided axial movable limitation of a control-pressure space, which is connectable and subject to outlet pressure of a precharging pump mean;
   said precharging pump supplies brake fluid to said return pump;

displacement of the actuating piston causes the ASR control valve (87) to assume its shut-off functional position, shutting off the brake units from the main brake line of the brake circuit of the driven vehicle wheels and is held in this shut-off position as long as the precharging pump is activated.

4. A braking system according to claim 3, wherein that the precharging pump is a gear pump.

5. A braking system according to claim 3, wherein the precharging pump is a piston pump which is driven by a drive provided for the return pumps.

6. A braking system according to claim 5, in that the precharging pump is a self-priming pump.

7. A braking system according to claim y, wherein the precharging pump includes a displacement controlled inlet valve which is moved into its open position while the pump piston is executing the final portion of its suction stroke and the initial portion of its deliver stroke and which is otherwise shut off.

8. A braking system according to claim 1, wherein an additional isolating valve is provided for each at least one of the wheel brakes for at least individually shutting off at least one of the driven wheel brakes from the return line of the brake circuit of the driven vehicle wheels.

9. A braking system according to claim 7, wherein the 2/2-way valves of the additionally isolating valves are jointly activatable.

10. A braking system according to claim 9, wherein two of said additional isolating valves are provided, each constituting hydraulically activatable valves which are changed over from their shut-off basic position into their throughflow position in response to an outlet pressure of the brake unit.

11. A braking system according to claim 9, wherein the brake unit has a piston which movably limits the outlet-pressure space of the brake unit that is assigned to the brake circuit of the driven vehicle wheels upon actuation of a brake pedal;

the two of said additional isolating valves are operatively arranged to be changed over from their shut-off position assigned to the ASR into their throughflow positions assigned to the normal braking mode and to the braking mode subjected to ABS; and the two of said additional isolating valves are moved in response to a small fraction of a possible total movement stroke of the brake-unit piston.

12. A braking system according to claim 9, wherein a precharging pump is provided for supplying brake fluid to the return pump;

the two of said additional isolating valves are actuable by movement of a hydromechanical control slide having an actuating piston which is displaceable in a control slide housing and which is urged by a restoring spring into its basic position;

the two isolating valves assume a throughflow basic position during ABS to connect the wheel brakes of the brake circuit of the driven vehicle wheels to the return line of this brake circuit;

the hydromechanical control slide includes a piston flange which forms a one-sided axially movable limitation of a control-pressure space within the control-slide housing;

the hydromechanical control slide is moved in response to outlet pressure of the precharging pump being connected to this control-pressure space to cause the actuating piston to be displaced; and the two of said additional isolating valves, after having been moved into their shut-off position during ASR by the actuating piston, remain held in this shut-off functional position as long as the charging pump is activated.

13. A braking control system according to claim 1, wherein an ASR outlet valve is provided for connecting a line portion of the brake circuit of the driven wheels that is subjected to brake pressure during one of normal braking and during braking under ABS to the pressureless brake-fluid reservoir of the brake system at least for the duration of the pressure reduction phases of ASR and otherwise is shut off from the brake-fluid reservoir.

14. A braking control system according to claim 13, wherein the ASR outlet valve is connected between the return line and the brake-fluid reservoir of the brake system.

15. A braking control system according to claim 13, wherein the ASR outlet valve is connected between the main brake line of the brake circuit assigned to the driven vehicle wheels and the brake-fluid reservoir of the brake system.

16. A braking system according to claim 13, wherein the ASR control valve is connected between the main brake line of the brake circuit assigned to the driven vehicle wheels and the brake unit; and brake-pressure regulating valves utilized both as inlet and as outlet valves between the driven wheel brakes and the brake unit.

17. A braking system according to claim 13, wherein the ASR outlet valves is a solenoid valve operational in response to output signals from an electronic unit provided for the ABS and the ASR.

18. A brake control system according to claim 13, wherein a precharging pump is provided for supplying brake fluid to the inlet of the return pump;

the ASR outlet valve is a mechanically switchable 2/2-way valve and is actuated by a hydromechanical control slide;

the control slide has an actuating piston which actuates the outlet valve;

the control slide is urged by a restoring spring into a basic position in which the ASR outlet valve assumes its basic position to shut-off the return line of the brake circuit of the driven vehicle wheels from the reservoir of the brake system; and the control slide experiences a displacement as a result of connecting a control-pressure space of the control slide to an outlet pressure of the precharging pump to thereby move the outlet valve into a functional position connecting the return line to the reservoir.

19. A braking system according to claim 18, wherein an outlet line from the recharging pump connected to a pump chamber of the return pump of the brake circuit of the driven vehicle wheels, is provided with a first supply control valve which, upon operation of the ASR outlet valve and the ASR control valve, can be changed over from its basic position in which the return line is connected via a low-pressure supply line to the outlet side of the outlet non-return valve of the precharging pump and into a functional position in which the outlet side of the outlet non-return valve of the precharging pump is connected directly to the inlet non-return valve of the return pump;

a second supply control valve is provided in said outlet line which has a basic shut-off position during a braking mode in which the precharging pump is shut off from its outlet non-return valve and a functional throughflow position during ASR to connect the precharging pump to the outlet non-return valve; and the second supply control valve is changed over to its throughflow position only after the first supply control valve and the outlet valve and ASR control valve have reached their functional positions assigned to ASR.

20. A braking system according to claim 19, wherein the second supply control valve is changed over to its throughflow position by a control surface on the acting piston of the control slide moving past an actuating tappet of the second supply control valve; and wherein the arrangement of the second supply control valve in relation to this control surface is such that the control surface of the actuating piston of the control slide comes into the region of the valve tappet only after anyone of the ASR control valve, the ASR outlet valve, the first supply control valve are changed over to their functional positions assigned to the ASR drive-slip control mode.

21. A braking system according to claim 19, wherein the first supply control valve is a mechanically controlled 3/2-way valve and is changed over from its basic position during ASR into the functional position provided for the braking mode in response to a piston displacement of the brake unit occurring during an actuation of the brake unit.

22. A braking system according to claim 18, wherein a safety valve is connected in parallel with the precharging pump and is moved during an actuation of the brake system by the brake unit means out of its shut-off basic position into its throughflow position, in which the control-pressure space of the control slide is connected directly to the pressureless brake-fluid reservoir of the brake system.

23. A braking system according to claim 22, wherein the safety valve is a pressure-controlled 2/2-way valve which is activated by the brake pressure generated in the secondary outlet-pressure space of the brake unit.

24. A braking system according to claim 1, wherein the ASR control valve is a 2/2-way valve and is operatively configured to shut off the main brake line of the brake circuit of the driven vehicle wheels at point between brake-pressure regulating valves of the wheel brakes and the brake unit in its ASR position and is open in the basic position to allow flow of brake fluid for normal braking.

25. A braking system according to claim 1, wherein the ASR control valve is connected between the brake unit and the reservoir of the brake unit.

26. A braking system according to claim 1, wherein the ASR control valve is an electrically activatable solenoid valve operative in response to output signals from an electronic ASR and ABS control unit which also generates activating signals necessary for the activation of the ABS and ASR controls.

27. A braking system according to claim 1, wherein each additional isolating valve is a 2/2-way valve operative in response to output signals from an electronic control unit provided for controlling the ABS and ASR.

28. A braking system according to claim 1, wherein the return pump of the brake circuit of the driven vehicle wheels is a self-priming pump.

29. A braking system according to claim 1, wherein a fault detection apparatus is provided to generate an indicator signal characteristic of the functioning of the brake system, as a result of a comparison of a first sensor output signal which is a measure of a displacement of a piston of a brake unit occurring as a result of an actuation of the brake system with a second sensor output signal which is a measure of a brake-actuating force occurring as a result of the brake actuation.

30. A braking system according to claim 29, wherein that the second sensor output signal is generated by a pressure sensor which monitors the brake pressure occurring in one of the brake circuits of the driven vehicle wheels.

31. A braking system according to claim 1, wherein the brake unit is a tandem master cylinder;

a fault detection apparatus is provided to generate signals characteristic of the functioning of the brake system;

said fault detection apparatus comprises two pistons of the tandem master cylinder and generating electrical output signals characteristic of the piston positions; and the fault detection apparatus generates its signal as a result of a comparative processing of these output signals.

* * * * *